US011510490B2

(12) United States Patent
Hill et al.

(10) Patent No.: US 11,510,490 B2
(45) Date of Patent: *Nov. 29, 2022

(54) BODYREST

(71) Applicant: Hypnap LLC, Waltham, MA (US)

(72) Inventors: Chloe Hill, Waltham, MA (US);
HyukJae Henry Yoo, Leonia, NJ (US);
John Lonczak, Newburgh, NY (US)

(73) Assignee: Hypnap LLC, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/030,643

(22) Filed: Sep. 24, 2020

(65) Prior Publication Data

US 2021/0007477 A1    Jan. 14, 2021

Related U.S. Application Data

(63) Continuation-in-part of application No. 16/138,154, filed on Sep. 21, 2018, now Pat. No. 10,813,451,
(Continued)

(51) Int. Cl.
*A47C 20/02* (2006.01)
*A47C 20/04* (2006.01)
(Continued)

(52) U.S. Cl.
CPC ............ *A47B 23/043* (2013.01); *A47C 7/383* (2013.01); *B60N 2/882* (2018.02); *B60N 3/001* (2013.01);
(Continued)

(58) Field of Classification Search
CPC ....... B60N 2/4879; A47C 7/383; A47C 20/02; A47C 20/04; A47C 20/046; A47C 20/048
See application file for complete search history.

(56) References Cited

U.S. PATENT DOCUMENTS 327,816 A    10/1885  Newbourg
456,089 A     7/1891  Harrison
(Continued)

FOREIGN PATENT DOCUMENTS

CN    202122397 U    1/2012
DE     29802573 U1    6/1998
(Continued)

OTHER PUBLICATIONS

G. J. Criner, "4 Secrets to Easier Breathing", Bottom Line Health, Feb. 1, 2014, bottomlinehealth.com/4-secrets-to-easier-breathing.
(Continued)

*Primary Examiner* — Timothy J Brindley
(74) *Attorney, Agent, or Firm* — Intrinsic Law Corp.

(57) ABSTRACT

A personal support apparatus includes a frame having an inner surface for supporting a forehead of a user while seated in a forward-leaning position. The frame has a hollow central region to receive the user's face when the user is seated in the forward-leaning position. A pair of cheek support bodies are disposed on the inner surface of the frame. The apparatus also includes a stand having a recess in a first end to receive a portion of the frame such that a position of the frame is adjustable within the recess to set a height of the frame with respect to the user. A chest support is disposed on the stand. A base is attached to the second end of the stand.

19 Claims, 23 Drawing Sheets

Related U.S. Application Data which is a continuation-in-part of application No. 15/467,130, filed on Mar. 23, 2017, now Pat. No. 10,226,130, which is a continuation-in-part of application No. 14/680,864, filed on Apr. 7, 2015, now Pat. No. 9,637,031.

(60) Provisional application No. 62/561,998, filed on Sep. 22, 2017, provisional application No. 62/398,660, filed on Sep. 23, 2016, provisional application No. 62/127,612, filed on Mar. 3, 2015, provisional application No. 61/976,563, filed on Apr. 8, 2014.

(51) Int. Cl.
*A47B 23/04* (2006.01)
*F16M 13/02* (2006.01)
*F16B 2/12* (2006.01)
*A47C 7/38* (2006.01)
*B60N 3/00* (2006.01)
*B60N 2/882* (2018.01)

(52) U.S. Cl.
CPC ............. *F16B 2/12* (2013.01); *F16M 13/022* (2013.01); *A47B 2200/0085* (2013.01)

(56) References Cited

U.S. PATENT DOCUMENTS

| | | | |
|---|---|---|---|
| 1,855,408 A | 4/1932 | Montenegro | |
| 2,693,400 A | 11/1954 | Erickson | |
| 3,386,392 A | 6/1968 | Gramm | |
| 3,625,161 A | 12/1971 | Rosner | |
| 3,828,377 A | 8/1974 | Fary | |
| 4,436,271 A | 3/1984 | Manso | |
| 4,802,708 A | 2/1989 | Vos et al. | |
| 5,044,026 A | 9/1991 | Matthews | |
| 5,046,433 A | 9/1991 | Kramer et al. | |
| 5,123,621 A | 6/1992 | Gates | |
| 5,269,229 A | 12/1993 | Akapantangkul | |
| 5,330,147 A | 7/1994 | Volcheff et al. | |
| 5,370,060 A | 12/1994 | Wang | |
| 5,769,369 A | 6/1998 | Meinel | |
| 5,797,578 A | 8/1998 | Graffeo et al. | |
| 6,581,226 B1 | 6/2003 | Brustein | |
| 6,647,573 B2 | 11/2003 | Corbin | |
| 6,684,431 B2 | 2/2004 | Splane, Jr. | |
| 6,857,149 B2 | 2/2005 | Hoggatt et al. | |
| 7,036,168 B1 | 5/2006 | Knickerbocker | |
| 7,364,129 B1 | 4/2008 | Levari, Jr. | |
| 7,669,812 B2 | 3/2010 | Yun | |
| 7,922,137 B2 | 4/2011 | Derry et al. | |
| 8,011,731 B2 | 9/2011 | Goddu | |
| 8,074,951 B2 | 12/2011 | Carnevali | |
| 8,176,587 B2 | 5/2012 | Matt | |
| 8,205,283 B1 | 6/2012 | Russell | |
| 8,387,930 B2 | 3/2013 | Drew et al. | |
| 8,413,943 B1 | 4/2013 | Li | |
| D683,463 S | 5/2013 | Huggins | |
| 8,469,325 B2 | 5/2013 | Yu | |
| 8,468,628 B1 | 6/2013 | Cheng | |
| 8,528,978 B2 | 9/2013 | Purpura et al. | |
| 8,763,969 B2 | 7/2014 | Wu et al. | |
| 8,814,128 B2 | 8/2014 | Trinh et al. | |
| 8,925,877 B2 | 1/2015 | Carnevali | |
| 8,985,693 B2 | 3/2015 | Purpura et al. | |
| 9,145,158 B2 | 9/2015 | Cruz | |
| 9,226,587 B2 | 1/2016 | Halimi | |
| 9,402,482 B2 * | 8/2016 | Miller .................. A47C 16/00 | |
| 9,448,588 B2 | 9/2016 | Barnard | |
| 9,568,141 B1 | 2/2017 | Zaloom | |
| 9,578,979 B1 | 2/2017 | Zeuch et al. | |
| 9,634,519 B2 | 4/2017 | King et al. | |
| 2002/0050009 A1 | 5/2002 | Ley | |
| 2002/0100846 A1 | 8/2002 | Tinsley | |
| 2003/0164010 A1 | 9/2003 | Galant | |
| 2003/0172462 A1 | 9/2003 | Hoggatt et al. | |
| 2008/0269544 A1 | 10/2008 | Atkin et al. | |
| 2008/0303318 A1 | 12/2008 | Hamilton | |
| 2009/0236893 A1 | 9/2009 | Ehlers et al. | |
| 2009/0308990 A1 | 12/2009 | Yen et al. | |
| 2010/0117435 A1 | 5/2010 | Samuelsen | |
| 2011/0277238 A1 | 11/2011 | Mabry | |
| 2012/0074272 A1 | 3/2012 | Hull | |
| 2012/0119040 A1 | 5/2012 | Ergun et al. | |
| 2012/0181821 A1 | 7/2012 | Edalati et al. | |
| 2013/0007961 A1 | 1/2013 | Noh | |
| 2013/0092805 A1 | 4/2013 | Funk et al. | |
| 2013/0232696 A1 | 9/2013 | Halimi et al. | |
| 2014/0033439 A1 | 2/2014 | Berhanu | |
| 2014/0097306 A1 | 4/2014 | Hale et al. | |
| 2014/0328020 A1 | 11/2014 | Galant | |
| 2015/0001905 A1 | 1/2015 | Jackow | |
| 2015/0034778 A1 | 2/2015 | Chang | |
| 2015/0123450 A1 | 5/2015 | Miller | |
| 2016/0120326 A1 * | 5/2016 | Belleh ................... B60N 2/806 297/391 |
| 2016/0151221 A1 * | 6/2016 | Mount .................... A47C 7/38 5/636 |
| 2016/0201359 A1 | 7/2016 | Berglund et al. | |
| 2016/0312950 A1 | 10/2016 | Bowman et al. | |

FOREIGN PATENT DOCUMENTS

| | | |
|---|---|---|
| EP | 2359720 A1 | 8/2011 |
| EP | 2589535 A1 | 5/2013 |
| WO | 2009108823 A1 | 9/2009 |
| WO | 2010129652 A1 | 11/2010 |
| WO | 2010138216 A1 | 12/2010 |
| WO | 2011066994 A2 | 6/2011 |

OTHER PUBLICATIONS

E. Dean, "Effect of Body Position on Pulmonary Function", Physical Therapy, May 1985, p. 613-618, vol. 65, No. 5.
"Labor and birth: 1st Stage of Labor (part 5)—Positions for First Stage of Labor", women.programming4.US/health/labor-and-birth-1st-stage-of-labor-(part5)-positions-for-first-stage-of-labor.aspx#3VQLHcqRwptV32BO.99.
L. Martelli-Reid et al., "Getting the air you need: A practical guide to coping with and managing shortness of breath", Juravinski Cancer Centre Information for patients and families, 2012, Hamilton Health Sciences, Ontario, Canada.
"Why is exercise important", Keeping Active with a Lung Condition, 2014, www.bif.org.uk/Page/Why-is-exercise-important, British Lung Foundation.
Moore et al., "Mind-Body skills for Regulating the Autonomic Nervous System", Jun. 2011, Version 2, Defense Centers of Excellence for Psychological Health & Traumatic Brain Injury, Arlington.
Skyrest, "Skyrest Travel Pillow", sold by Planet Stuff, www.amazon.com/Skyrest-Travel-Pillow/dp/B00GMQU948.
EZsnooz, "eZsnooZ All Purpose Travel Cushion", via YouTube, uploaded Jul. 21, 2008, www.youtube.com/watch?v=IEaenYh-jFg.
Eugene, OR Website, "Diaphragm Deep Breathing", www.eugene-or.gov/DocumentCenter/View/14142.
Wikipedia, "Tripod position", Wikipedia, the free encyclopedia.
U.S. International Searching Authority, "International Search Report and Written Opinion of the International Searching Authority, App. No. PCT/US 15/24817", dated Jul. 13, 2015, WIPO.

* cited by examiner

BODYREST

RELATED APPLICATIONS

This application is continuation-in-part of U.S. patent application Ser. No. 16/138,154, titled "Mobile Device Stand," filed on Sep. 21, 2018, which is a continuation-in-part of U.S. patent application Ser. No. 15/467,130, titled "Bodyrest," filed on Mar. 23, 2017, now U.S. Pat. No. 10,226,130, which is a continuation-in-part of U.S. patent application Ser. No. 14/680,864, titled "Bodyrest," filed on Apr. 7, 2015, now U.S. Pat. No. 9,637,031, which claims priority to U.S. Provisional Application No. 61/976,563, titled "Headrest," filed on Apr. 8, 2014, and to U.S. Provisional Application No. 62/127,612, titled "Bodyrest," filed on Mar. 3, 2015. In addition, U.S. patent application Ser. No. 16/138,154 claims also priority to U.S. Provisional Application No. 62/561,998, titled "Mobile Device Stand," filed on Sep. 22, 2017. Further, U.S. patent application Ser. No. 15/467,130 claims priority to U.S. Provisional Application No. 62/398,660, titled "Mobile Device Stand," filed on Sep. 23, 2016. The disclosure of each of the foregoing applications is hereby incorporated by reference.

TECHNICAL FIELD

The present application generally relates to devices for supporting the body and more particularly to devices for supporting the head and upper body in a forward-leaning position.

BACKGROUND

Sleeping in the seated position is difficult for most people. There are occasions where and reasons why people desire rest and sleep but are unable to avoid the seated position, for example when the person is on an airplane, in a wheelchair, or at an office desk. Also, some people cannot sleep in bed due to back pain or other physical issues. The airline industry has attempted to address this issue by allowing passengers to recline in their seats. However, most economy and business class seats do not recline more than 35 degrees, which most people still find uncomfortable.

Many devices have been conceived and created to address this problem. However, none have solved this problem to a satisfying degree. Existing headrests, backrests, and bodyrest devices designed to be used while seated in the upright position (e.g., neck pillows, sleep aids and the like), can support, decrease pressure and reduce strain on the neck or back, but not both simultaneously. Thus comfort for the user is never fully realized. For example, neck pillows and neck supports are placed behind or next to the user. While such devices take the pressure off the neck, there is still considerable discomfort and strain on the back because the user is forced to hold herself upright by using other muscles. Backrests can reduce pressure from certain muscle groups in the back. However, the user is still required to hold himself upright using other muscle groups. Also, pressure and strain remain on the neck because the neck is not supported. Moreover, if the user does manage to fall asleep using a backrest, the user's head often tilts forward causing the person to wake up.

Some headrests can be used while the user leans forward (e.g., on an airplane tray table). However, such headrests are deficient in several aspects. For example, some of these headrests lack an opening for breathing so the user must turn her head to the side. This causes strain on and discomfort of the neck because the neck bears most of the pressure and weight. Also, the headrests do not support the user's upper body so must use certain back muscles to partially support the torso so that the neck does not bear all of the weight and pressure. Furthermore they are not adjustable in height or angle so users of different heights are not accommodated and proper alignment of the back and neck is not achieved. Also, there is no existing sleep or rest aid that allows the user to lean in a face-down, forward leaning position that is not only adjustable in height and in angle but is also collapsible and portable so that the user can easily transport and carry the device while traveling.

An example of an existing headrest that includes some or all of these deficiencies is disclosed in U.S. Pat. No. 6,684,431 ("the '431 patent"), titled "Angle-Adjustable Tabletop Personal Support Apparatus." This headrest is designed to support a user's head and upper body while the user is having an upper-body massage. One deficiency in this headrest is that its bulky cushions (e.g., formed of stuffed foam) increase the form factor of the headrest and make its portability difficult or impossible. However, the bulky cushions are an important component of the headrest because they provide comfort to the user even though the adjustability of the headrest is limited.

In addition, people with respiratory illnesses such as chronic obstructive pulmonary disease (there are approximately 3 million cases in the US per year) are frequently prescribed by doctors and physical therapists to rest in the supported forward-leaning position as an adjunct to medical treatment when breathing becomes difficult. Resting in such a lean forward position optimizes the mechanics of respiration by easing the work of the chest muscles and engaging the diaphragm allowing people to breathe easier and deeper. People with certain back problems and pain such as those with herniated discs and pregnant women are also frequently prescribed by doctors to rest in the supported forward-leaning position to ease back pain. People who have herniated discs find both lying down and sitting up to be painful. The only way for people with herniated discs to get comfortable is to rest in the supported forward-leaning position because this position expands the spine easing pressure of the discs of the spine against the nerves and cartilage that are between and close to the discs. In addition, it is difficult for some people with muscular dystrophy to sit upright for long periods of time due to weakened back and neck muscles. Lying down or resting in the supported lean forward position is the only way to ease the pressure on the back and neck muscles. Some people with the conditions mentioned above are in so much pain that they must have access to places that they can rest in the forward leaning position often and for long periods of time making it difficult for them to leave their home and for them to work and be productive. Currently there is no device that is lightweight, portable and collapsible that allows people to rest in the supported lean forward position to relieve their pain symptoms when they are out of the home and when they are in the home they must resort to rest leaning forward against a pillow placed on a table or desk or sit backwards in a chair and lean against the back of the chair which is not ideal or comfortable. Others must purchase a costly and cumbersome forward leaning massage chair.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

In an aspect, the invention is directed to a personal support apparatus. The personal support apparatus comprises a frame having an inner surface for supporting a forehead of a user while seated in a forward-leaning position, the frame having a hollow central region to receive the user's face when the user is seated in the forward-leaning position; a pair of cheek support bodies disposed on the inner surface of the frame, each cheek support body having a cross-sectional thickness such that an exposed surface of the cheek support body is located closer to the user than the inner surface of the frame; a stand having a first end and a second end, the first end defining a recess to receive a portion of the frame, wherein a position of the frame is adjustable within the recess to set a height of the frame with respect to the user; a chest support disposed on the stand; and a base attached to the second end of the stand.

In one or more embodiments, the apparatus further comprises a cheek support cushion disposed on the cheek support bodies, the cheek support cushion adjustably attached to the frame. In one or more embodiments, the cheek support cushion extends along the frame between each cheek support body and wherein a central region of the cheek support cushion is configured to support the user's chin. In one or more embodiments, the cheek support cushion is configured to be adjusted inwardly, with respect to the cheek support bodies, to accommodate a first user having a narrow face and configured to be adjusted outwardly, with respect to the cheek support bodies, to accommodate a second user having a wide face. In one or more embodiments, the cheek support cushion is configured to be adjusted upwardly, with respect to the cheek support bodies, to accommodate a first user having a short face and configured to be adjusted downwardly, with respect to the cheek support bodies, to accommodate a second user having a long face.

In one or more embodiments, the apparatus further comprises a forehead support cushion adjustably attached to the frame. In one or more embodiments, the forehead support cushion is configured to be adjusted upwardly to accommodate a first user having a long face and configured to be adjusted downwardly to accommodate a second user having a short face. In one or more embodiments, the hollow central region of the frame is configured to receive eyeglasses worn by the user while seated in the forward-leaning position, such that the eyeglasses are not in physical contact with the frame.

In one or more embodiments, a position of the chest support on the stand is adjustable such that the user can align the chest support with the user's sternum. In one or more embodiments, the stand includes a recess and the chest support is adjustably mounted along the recess. In one or more embodiments, the inner surface of the frame is curved to conform to the user's face. In one or more embodiments, the apparatus further comprises a plurality of mobile device supports adjustably disposed on the frame.

Another aspect of the invention is directed to a personal support apparatus. The personal support apparatus comprises a frame having an inner surface for supporting a forehead of a user while seated in a forward-leaning position, the frame having a hollow central region to receive the user's face when the user is seated in the forward-leaning position; a pair of cheek support bodies disposed on the inner surface of the frame, each cheek support body having a cross-sectional thickness such that an exposed surface of the cheek support body is located closer to the user than the inner surface of the frame; a cheek support cushion disposed on the cheek support bodies, the cheek support cushion adjustably attached to the frame, wherein the cheek support cushion is configured to be adjusted inwardly, with respect to the cheek support bodies, to accommodate a first user having a narrow face and configured to be adjusted outwardly, with respect to the cheek support bodies, to accommodate a second user having a wide face; a forehead support cushion adjustably attached to the frame, wherein the forehead support cushion is configured to be adjusted upwardly to accommodate a first user having a long face and configured to be adjusted downwardly to accommodate a second user having a short face; a stand having a first end and a second end, wherein the first end of the stand is attached to the frame; a chest support adjustably disposed on the stand; and a base attached to the second end of the stand.

In one or more embodiments, the frame has a curved contour. In one or more embodiments, the forehead support cushion comprises a gel body having opposing first and second surfaces, wherein a plurality of notches is defined in the first surface such that the gel body can flex inwardly from an unflexed state where the second surface is substantially planar to a flexed state where the second surface has a curved surface to conform to the inner surface of the frame. In one or more embodiments, the cheek support cushion extends along the frame between each cheek support body and wherein a central region of the cheek support cushion is configured to support the user's chin. In one or more embodiments, the cheek support cushion comprises a gel body, the gel body having a plurality of notches defined therein at the central region of the support cushion. In one or more embodiments, the notches are configured to allow the cheek support cushion to flex into substantially a U-shape.

In one or more embodiments, a recess is defined on an outer surface of the frame proximal to each cheek support body, the recess configured to receive an aromatherapy strip that extends across the frame, such that the aromatherapy strip is disposed proximal to the user's nose. In one or more embodiments, the apparatus further comprises a plurality of mobile device supports adjustably disposed on the frame.

IN THE DRAWINGS

For a fuller understanding of the nature and advantages of the present invention, reference is made to the following detailed description of preferred embodiments and in connection with the accompanying drawings, in which.

DETAILED DESCRIPTION

Figure 1:
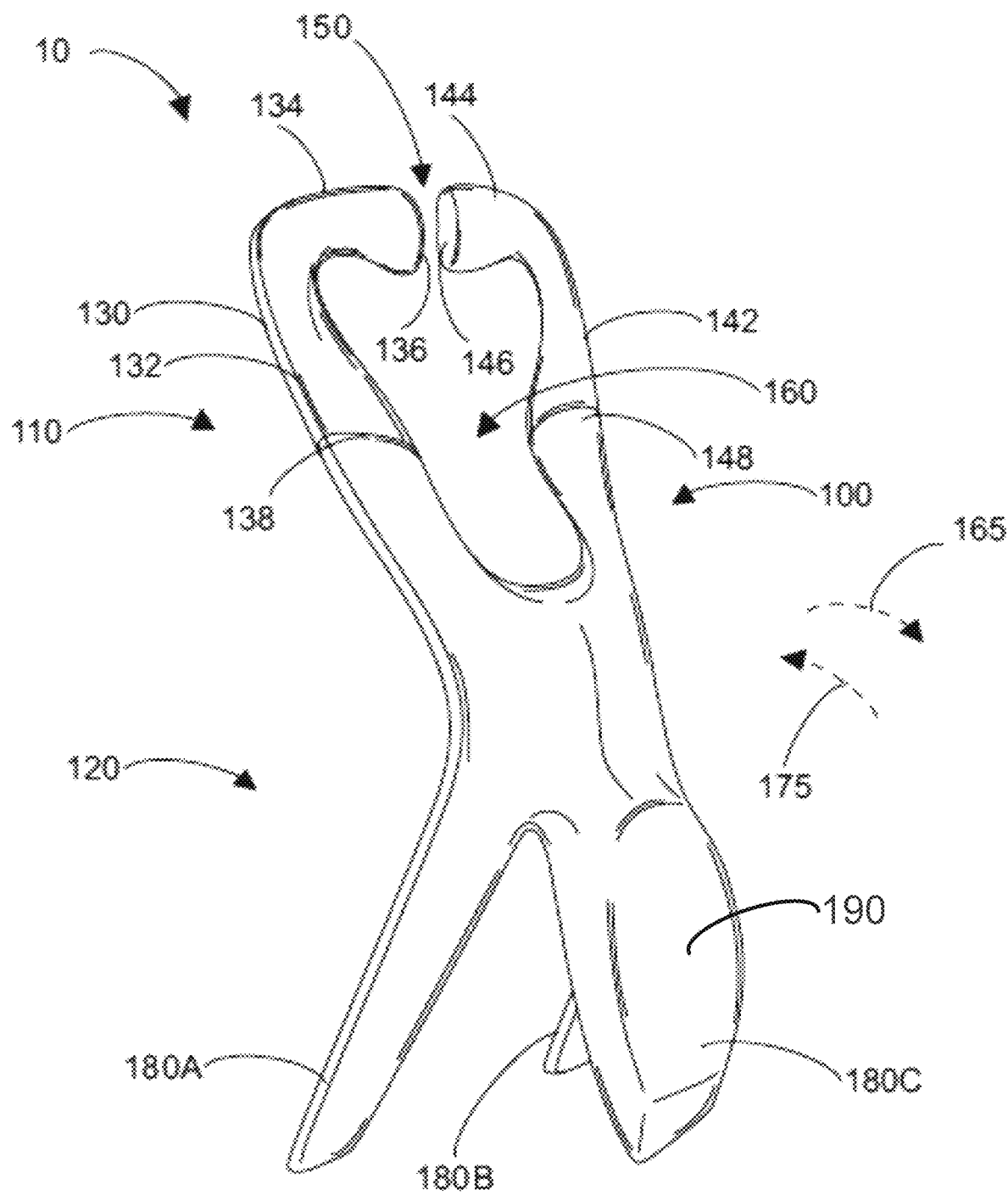
FIG. 1 illustrates a perspective view of a bodyrest according to an embodiment.

This disclosure describes bodyrests and body supports configured for users seated in a forward-leaning position. The bodyrest includes a head support mechanically connected to a body. The head support includes one or more support members that are configured to support one or more portions of a user's face, such as the user's forehead and/or the sides of the user's face (e.g., cheeks or jawline). The support members define an aperture or gap that is aligned with one or more sensory organs on the user's face. For example, the aperture or gap can be aligned with the user's mouth, nose, and/or eyes.

A chest support can be mechanically coupled and/or integrated with the elongated body. The chest support can include a pad or pillow to mechanically support the user's chest and upper body while a user's head is disposed in the bodyrest.

The base can have a generally planar surface to conform to a tabletop or airline tray table. In addition or in the alternative, the base can include a support member that defines an open channel that can grip an edge of a table or airline tray table.

The bodyrest can be adjusted along multiple degrees of freedom. For example, the height of the head support can be adjusted with respect to the body. In addition or in the alternative, the head support can pivot towards or away from the user to support the user's head at different positions and angles. In addition or in the alternative, the support members can be adjusted laterally to fit different size heads. In addition or in the alternative, a position of the chest support can be adjusted with respect to the elongated body so the chest support can have an adjustable height to accommodate different users. In addition or in the alternative, the body and/or the base can move towards or away from the user to adjust a distance between the user and the bodyrest.

In some embodiments, the bodyrest can be folded and/or broken down into various components for portability and storage.

The bodyrests disclosed herein can provide improved comfort for the user. The bodyrests can reduce pain and/or strain on the torso including the back, shoulders, and neck. In addition, the bodyrests can facilitate deeper, easier and/or more efficient breathing by allowing the user to rest in a supported forward-leaning position. For example, the bodyrests can reduce the workload of the chest muscles and prevent engaging the diaphragm.

Such bodyrests can be beneficial (e.g., as an adjunct to medical treatment) for users with respiratory diseases including chronic lung disease and/or for users with certain back problems, such as back problems that occur while traveling in an airplane seat.

It is understood that the present disclosure is often drafted in the context of a user sitting on a seat such as an airplane seat, but the present disclosure is not so limited, and can be applied to various types of users as would be appreciated by those skilled in the art with suitable modifications to the size and/or form factor of the device, without departing from the spirit of the disclosure. For example, the disclosure can be applied to users in a wheelchair, in a hospital setting, or at a desk.

FIG. 1 illustrates an embodiment of a foldable bodyrest 10 for a user in a forward-leaning position. The bodyrest 10 includes a body 100 having an upper portion 110 and a lower portion 120. The upper portion 110 includes a first support arm 130 and a second support arm 140. As illustrated, the first support arm 130 includes a first generally vertical section 132 and a first generally horizontal section 134. Likewise, the second support arm 140 includes a second generally vertical section 142 and a second generally horizontal section 144. The first and second horizontal sections 134, 144 extend inwardly towards each other. The first and second support arms 130, 140 can be generally symmetrical. The bodyrest 10 can be a personal support apparatus and/or a personal rest system.

When the user leans forward, the first and second support arms 130, 140 are disposed against the user's face to provide support thereto. For example, the first vertical section 132 of the first support arm 130 can be disposed against a first side of a user's face, such as the user's first cheek. The first horizontal section 134 of the first support arm 130 can be disposed against a top of the user's face, such as a first portion of the user's forehead. Likewise, the second vertical section 142 of the second support arm 140 can be disposed against a second side of a user's face, such as the user's second cheek. The second horizontal section 134 of the second support arm 140 can be disposed against a top of the user's face, such as a second portion the user's forehead.

A gap 150 is disposed between a first end 136 of the first horizontal section 134 and a second end 146 of the second horizontal section 144. The gap 150 allows the first and second support arms 130, 140 to flexibly adjust to the size of the user's face (e.g., the size of the user's forehead).

The first and second support arms 130, 140 define an aperture 160 therebetween. The aperture 160 is generally aligned to a user's face when the user is in a forward-leaning position. For example, the user's mouth, nose, and/or eyes can be aligned with the aperture 160. The aperture 160 allows the user to breathe easily while using the bodyrest 10 and to do various activities such as speak, sleep, read, look at a computer or tablet, etc.

The first and second vertical sections 132, 142 of the first and second support arms 130, 140 include first and second creases 138, 148, respectively. The creases 138, 148 allow the support arms 130, 140 to fold approximately in half for storage and/or portability. The support arms 130, 140 can fold towards the user in a first direction 165 while the support arms 130, 140 support the user in a second direction 175 away from the user. It is noted that the first and second arms 130, 140 can include additional creases and/or folds as would be recognized by those skilled in the art.

The lower portion 120 of the body 100 includes three legs 180A, 180B, and 180C. Legs 180A and 180B are disposed away from the user while leg 180C is disposed towards the user to form a tripod-like stand. The legs 180A-C can pivot with respect to the body 100 to a partially portable or stowed position. In the partially-stowed position, the legs 180A-C are aligned with respect to the upper portion 120 of the body 100 to form a generally planar surface, thus reducing the size of the body 100 along an axis orthogonal to the planar surface. As recognized by those skilled in the art, the bodyrest 10 can include additional or fewer legs 180A-C. Likewise, the legs 180A-C can be in different configurations, such as two legs disposed towards the user and one leg disposed away from the user.

At least one leg 180C includes a chest support 190. The chest support 190 includes a cushion and/or a rubber-like material for supporting the user's chest when the user is seated in a forward-leaning position. The chest support 190 can provide additional comfort to the user by supporting a portion of the user's weight. In some embodiments, a height and/or position of the chest support 190 is adjustable to provide a degree of freedom. For example, the chest support 190 can be removably attached to the leg 180C (e.g., with a hook and loop fastener).

Figure 2:
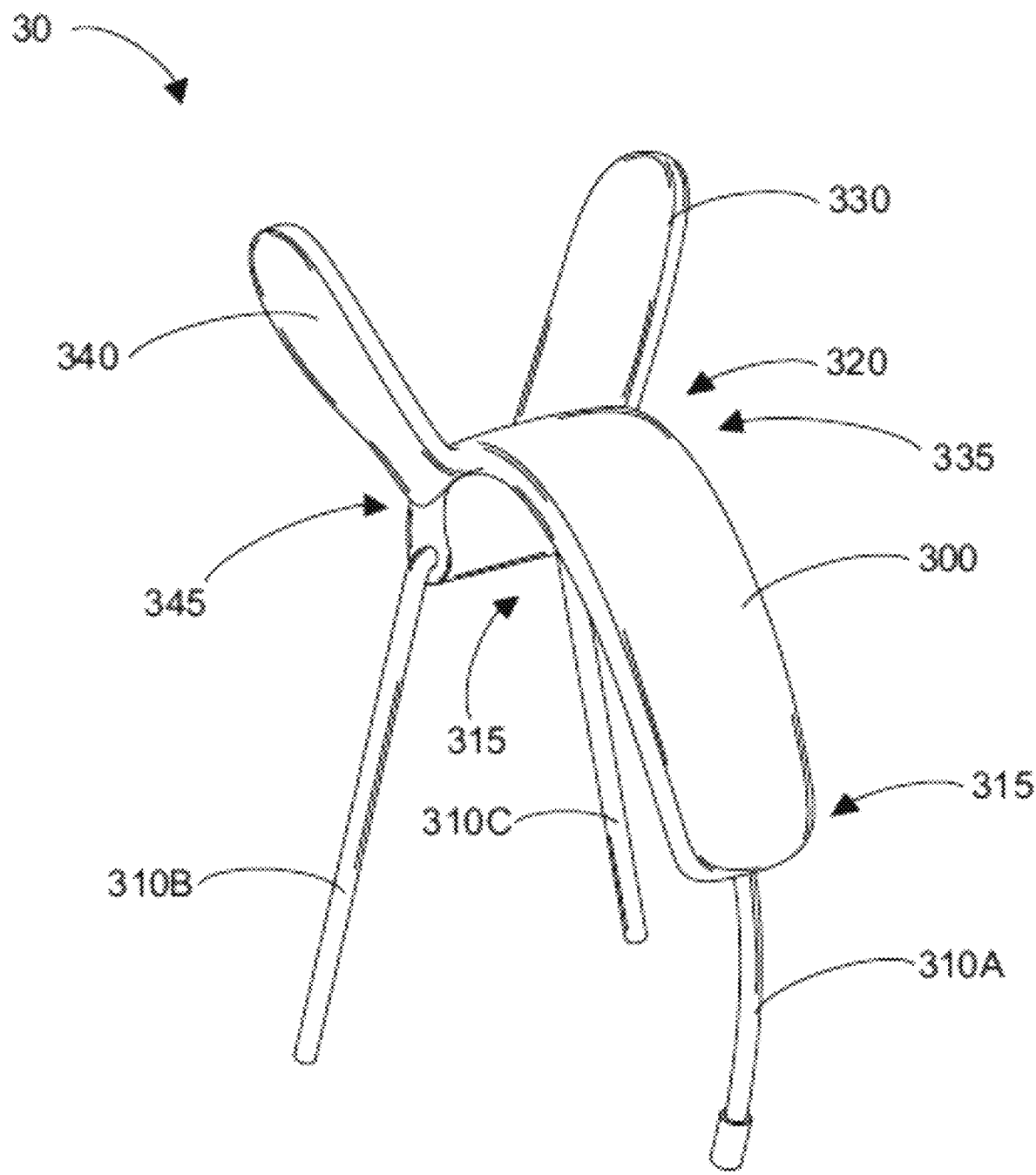
FIG. 2 illustrates a perspective view of a bodyrest according to an embodiment.

FIG. 2 illustrates an embodiment of a bodyrest 30 or personal support system for a user seated in a forward-leaning position. The bodyrest 30 includes a central body 300 coupled to legs 310A, 310B, 310C. The body 300 is generally elongated from a first end 315 to a second end 320. In addition, the body 300 is arched 315 away from the legs 310A-C from the first end 315 to the second end 320. The first end 315 is disposed proximally a user. The second end 320 is disposed distally to the user. Lateral supports 330, 340 are coupled to opposing sides 335, 345, respectively, of the second end 320 of the body. The bodyrest 30 can be a personal support apparatus and/or a personal rest system.

The legs 310A-C mechanically mount to and/or support the body 300 on a surface 350. In some embodiments, a height of the legs 310A-C is mechanically adjustable (e.g., telescoping) to accommodate users of various heights to provide a degree of freedom. In addition or in the alternative, the legs 310A-C are removable and/or pivotable for enhanced storage and portability.

In use, the arch 315 in the body 300 conforms and provides support to the user's torso/chest while the second end 320 of the body 300 supports the bottom of the user's head (e.g., the user's chin). The lateral supports 330, 340 can be configured to rest against opposing sides of the user's face (e.g., along the temples and/or cheeks) while using the bodyrest 30.

Figure 3:
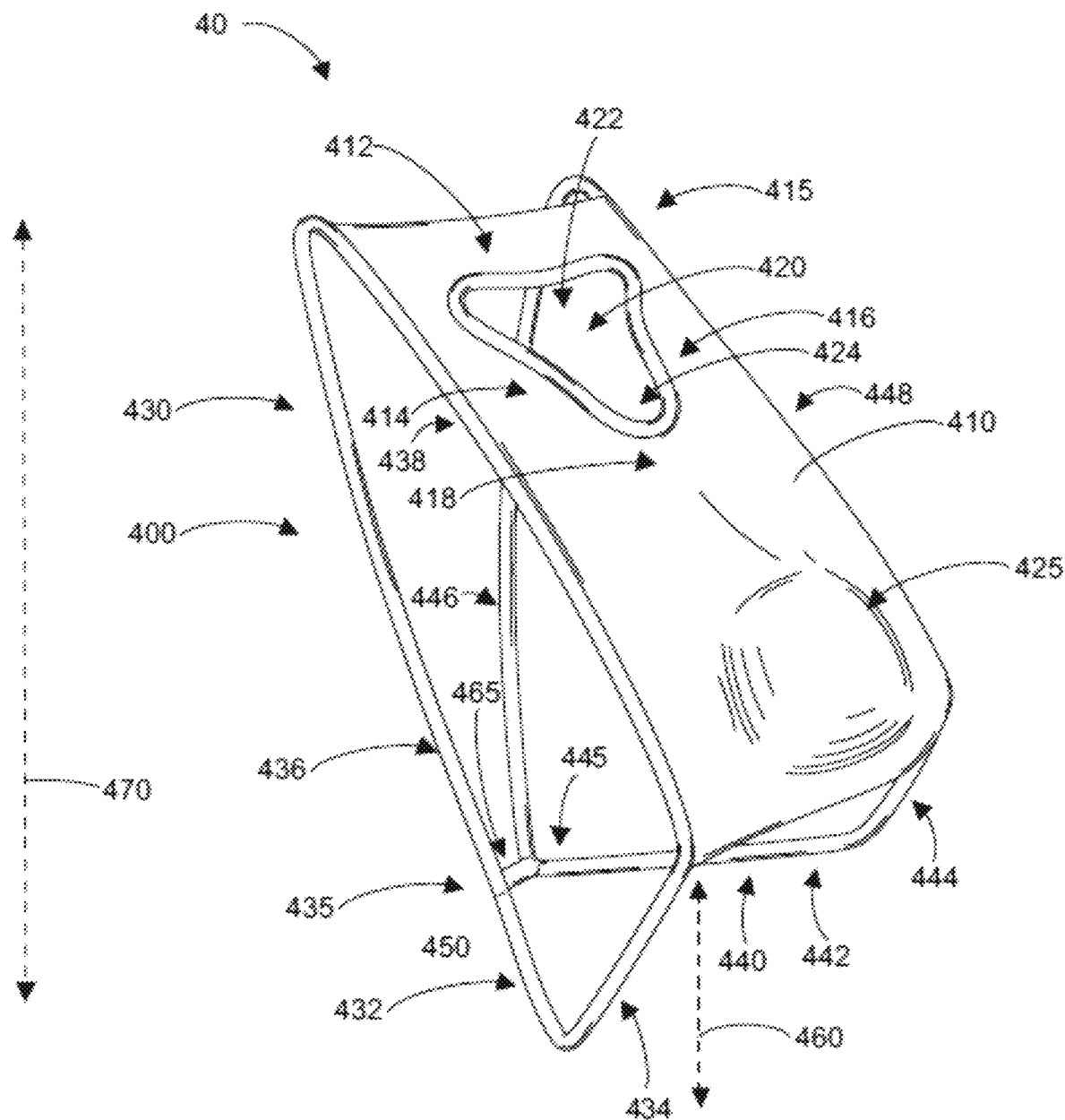
FIG. 3 illustrates a perspective view of a bodyrest according to an embodiment.

FIG. 3 illustrates a perspective view of an embodiment of a bodyrest 40 for a user seated in a forward-leaning position. The bodyrest 40 can be a personal support apparatus and/or a personal rest system.

The bodyrest 40 includes a stretchable support 410 mounted on a frame 400. The support 410 defines an aperture 420 at a first end 415 thereof for receiving a portion of the user's face. The aperture 420 includes a first part 422 that generally aligns with the user's eyes and a second part 424 that generally aligns with the user's nose and mouth. A first portion 412 of the support 410 above the first part 422 of the aperture 420 is disposed against the user's forehead to provide mechanical support thereto. Second portions 414, 416 of the support 410 are disposed against the sides (e.g., cheeks) of the user's face to provide mechanical support thereto. A third portion 418 of the support 410 is disposed against the bottom of the user's face (e.g., chin) to provide mechanical support thereto. The stretchable support 410 can be made out of an elastic, nylon, LYCRA®, spandex, or the like.

A chest support 425 is disposed at a second end 418 of the support 410. The chest support 425 can include a cushion, a rubberized material, or similar device for mechanically supporting the user's chest. The chest support 425 can be adjustable and/or removable to provide a degree of freedom.

The frame 400 includes first and second sections 430, 440. Each section 430, 440 includes a respective base portion 432, 442, a respective front stand portion 434, 444, a respective rear stand portion 436, 446, and a respective support portion 438, 448. The base portions 432, 442 are disposed against a surface 450 such as the ground or tabletop (e.g., a tray tabletop) to mount the bodyrest 40 for use. The base portions 432, 442 are connected together at respective distal ends 435, 445 with a coupling 465 such as a wire. The coupling 465 can enhance the mechanical strength of the frame 400.

The front stand portions 432, 442 and rear stand portions 436, 446 are coupled to the respective base portions 432, 442 and to the respective support portions 438, 448. In general, the front stand portions 432, 442 have a first height 460 and the rear stand portions 436, 446 have a second height 470, which is less than the first height 460. The front stand portions 432, 442 and rear stand portions 436, 446 provide mechanical support and alignment for a height and an angle of the respective support portions 438, 448. The support portions 438, 448 extend at a reclined angle from the first height 460 to the second height 470 to generally align with the user's chest and head in a forward-leaning position. The support portions 438, 448 mechanically support the stretchable support 410 similar to a hammock.

Figure 4:
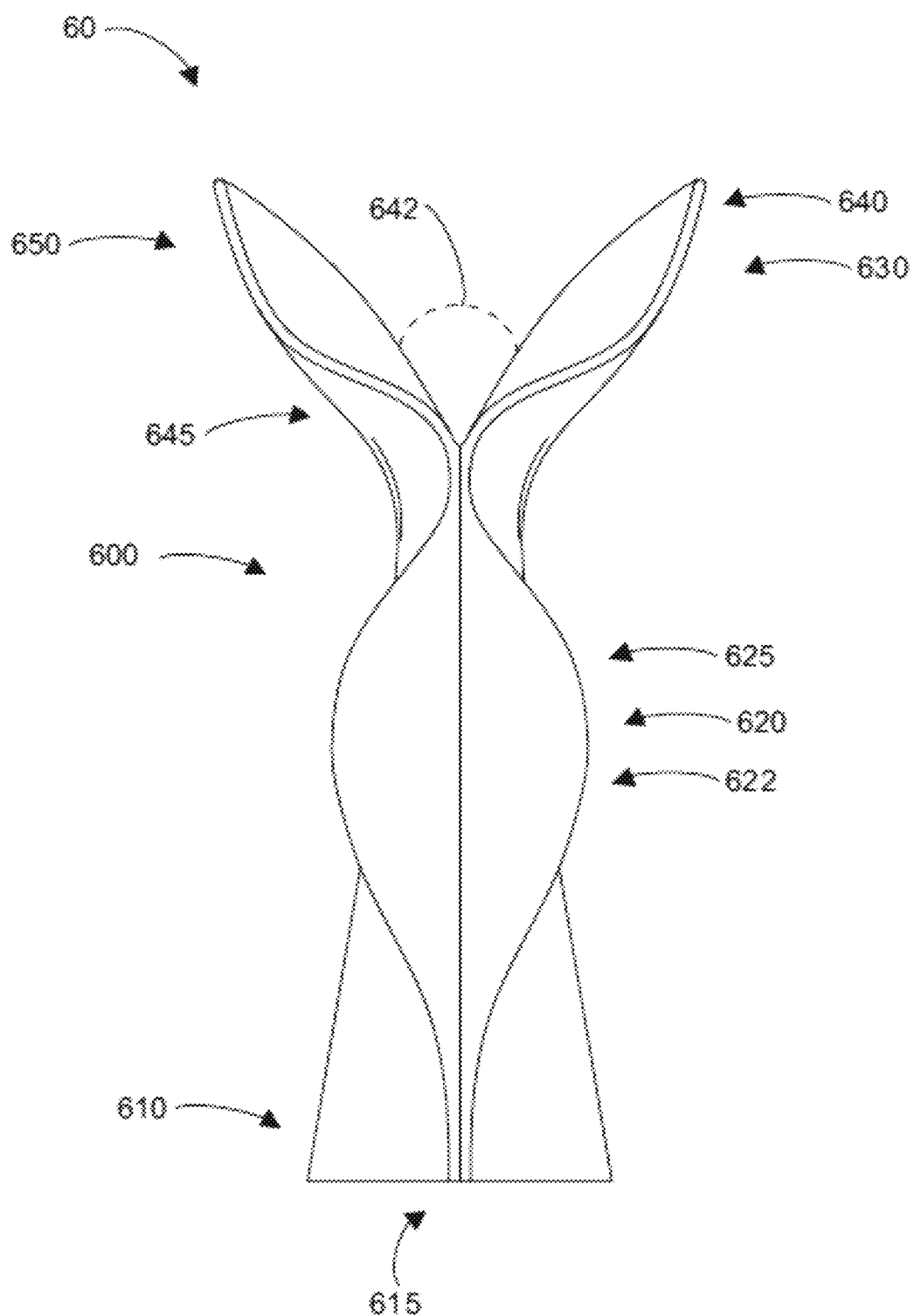
FIG. 4 illustrates a front view of a bodyrest according to an embodiment.

FIG. 4 illustrates an embodiment of a bodyrest 60 for a user seated in a forward-leaning position. The bodyrest 60 includes a generally elongated body 600 having a base 610, a chest support 620, and a head support 630. The base 610 has an exposed surface 615 that is generally planar for supporting the body 600 on a flat surface such as a tabletop, an airplane tray table, etc. The bodyrest 60 can be a personal support apparatus and/or a personal rest system.

The chest support 620 has an exposed surface 622 and a generally curved edge 625. The exposed surface 622 is positioned against a user's chest to provide support thereto. The chest support 620 can include a cushion and/or a rubber-like material for supporting the user's chest when the user is seated in a forward-leaning position. The chest support 620 can provide additional comfort to the user by supporting a portion of the user's weight. The chest support 620 and body 600 can have a curved profile, which can conform to a user's chest and/or upper body when the user is seated in a forward-leaning position. In some embodiments, the chest support 620 is adjustable and/or removable to provide a degree of freedom.

The head support 630 includes a first support arm 640 and a second support arm 650. The first and second support arms 640, 650 are disposed at an angle 642 with respect to one another to form a structure similar to a V. A chin support 645 is formed at the intersection of the support arms 640, 650 (i.e., at the vertex of the "V"). The support arms 640, 650 are aligned with opposing sides of a user's face to provide support thereto when the user is seated in a forward-leaning position. The support arms 640, 650 can be aligned with the user's cheeks, jawbone, forehead, and/or another portion of the front and/or side of the user's head. The support arms 640, 650 are moveable towards or away from each other to adjust a position of the support arms 640, 650 on the user and to provide a degree of freedom.

Figure 5:
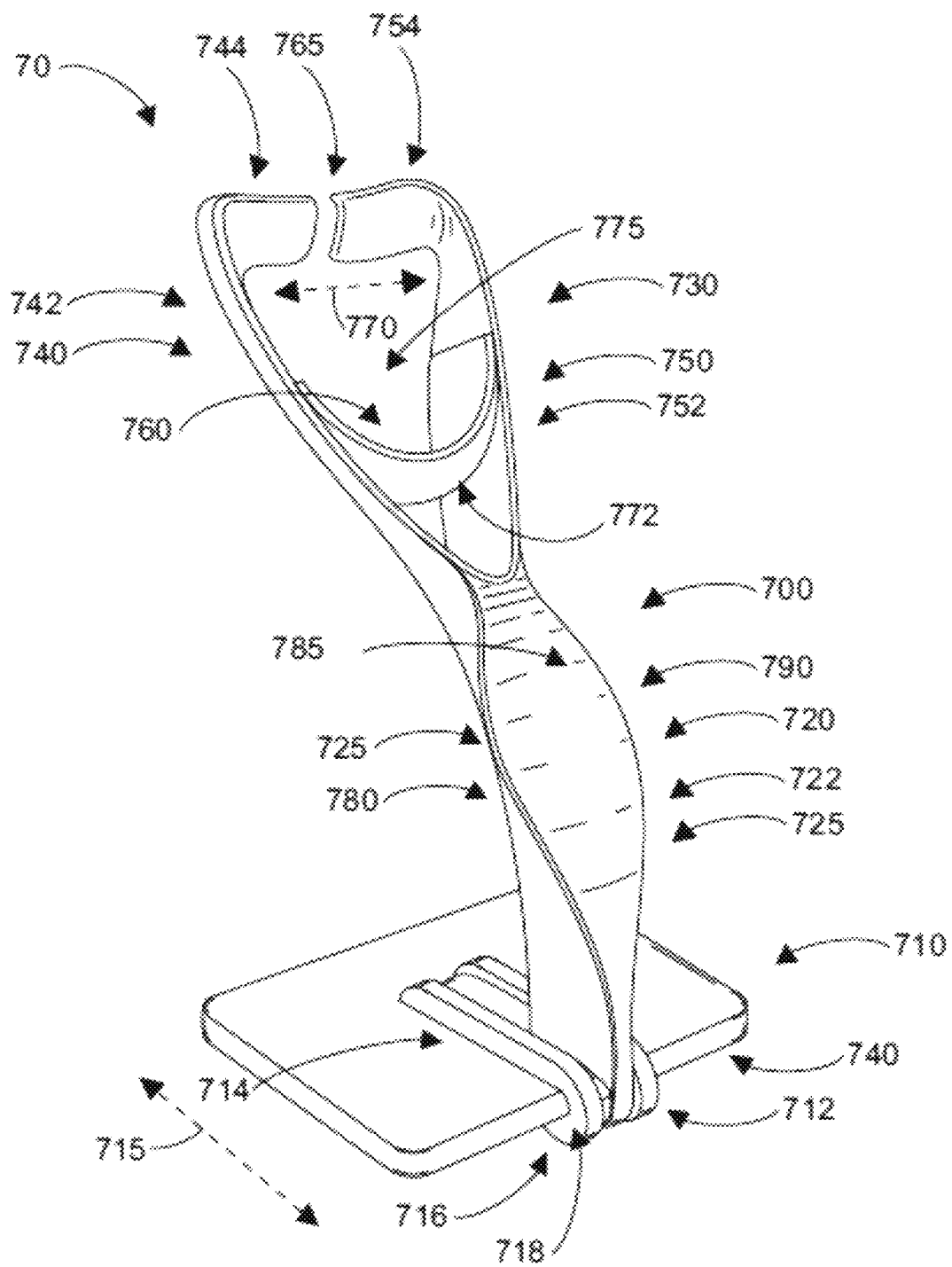
FIG. 5 illustrates a perspective view of a bodyrest according to an embodiment.

FIG. 5 illustrates an embodiment of a bodyrest 70 for a user seated in a forward-leaning position. The bodyrest 70 can be a personal support apparatus and/or a personal rest system.

The bodyrest 70 includes a body 700 connected to a base 710. The base 710 includes a U-shaped attachment member 712 comprising a top portion 714 and a bottom portion 716. The top portion 714 and bottom portion 716 define an open channel 718 to receive an edge 740 of a table, an airplane tray table, etc. on which the bodyrest 70 is placed. The open channel 718 faces away from the user when the user uses the bodyrest 70 so that the user pushes the base 710 against the edge 740 of the table. Thus, the open channel 718 can anchor or mount the bodyrest 70 to the edge 740 of the table. In some embodiments, at least a portion of the open channel 718 is narrower than the edge 740 of the table such that the top and bottom portions 714, 716 of the attachment member 712 can mechanically grasp the edge 740 of the table.

The body 700 includes a chest support 720 and a head support 730. The chest support 720 has an exposed surface 722 and a generally curved edge 725. The exposed surface 722 is positioned against a user's chest to provide support thereto, as discussed above. The chest support 720 can include a cushion and/or a rubber-like material for supporting the user's chest when the user is seated in a forward-leaning position. The chest support 720 can provide additional comfort to the user by supporting a portion of the user's weight. The chest support 720 can have a curved profile, which can conform to a user's chest and/or upper body when the user is seated in a forward-leaning position. The chest support 720 can be adjustable and/or removable as discussed above.

The head support 730 includes a first support arm 740, a second support arm 750, and a chin support 760. The first and second support arms 740, 750 are configured to support opposing sides of the user's face and a top of the user's face (e.g., the forehead) when the user is seated in a forward-leaning position. The support arms 740, 750 include respective vertical portions 742, 752, and horizontal portions 744, 754. The vertical portions 742, 752 can generally align with opposing sides of the user's face, as described above. The horizontal portions 744, 754 generally align with the top of the user's face. The horizontal portions 744, 754 define a gap 765 therebetween, which allows the arms 740, 750 to flex inwardly or outwardly along a direction 770 parallel to the horizontal portions 744, 754. By flexing the arms 740, 750, the head support 730 can adjust to accommodate users with different head sizes.

The chin support 760 is a curved structure that extends from the first support arm 740 to the second support arm 750. The curve 772 generally conforms to and aligns with the user's chin.

The arms 740, 750 and the chin support 760 define an aperture 775. The aperture 775 is generally aligned to a user's face when the user is seated in a forward-leaning position. For example, the user's mouth, nose, and/or eyes can be aligned with the aperture 775. The aperture 775 provides an air path for the user and it allows the user to do various activities such as speak, sleep, read, look at a computer or tablet, etc. while using the bodyrest 70.

In some embodiments, the body 700 is adjustable along a length 715 of the base 710 to move of the body 700 towards or away from the user. In some embodiments, a screw is disposed in the top portion 714 and/or the bottom portion 716 of the base 710 to enhance the mechanical coupling of the base 710 and/or the attachment member 712 to the edge 740 of the table.

For storage, the body 700 and base 710 can split into first and second halves 780, 790 along a central seam 785. The central seam 785 extends to the chin support 760 and is aligned with the gap 765 between the arms 740, 750. A securing mechanism (e.g., one or more screws) secures the halves 780, 790 together when the bodyrest 70 is in use.

Figure 6:
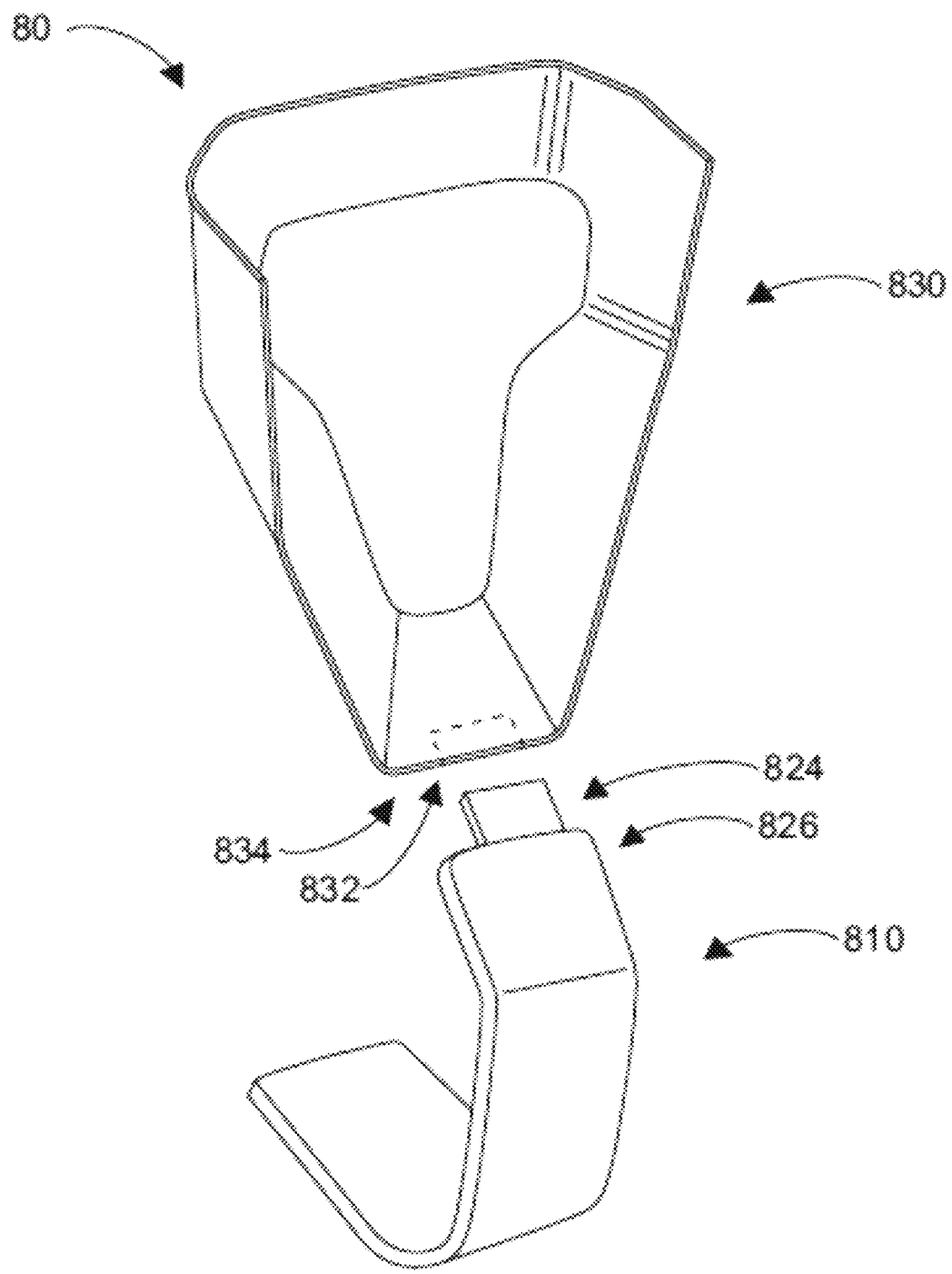
FIG. 6 illustrates a perspective view of a bodyrest according to an embodiment.

FIG. 6 illustrates a perspective view of an embodiment of a bodyrest 80 for a user seated in a forward-leaning position. The bodyrest 80 can be a personal support apparatus and/or a personal rest system.

The bodyrest 80 includes a base 810 mechanically connected to a head support 830. The base 810 includes a stand portion 812, a vertical portion 814, and an inclined portion 816. The vertical portion 814 is disposed between the stand portion 812 and the inclined portion 816. The stand portion 812 is generally planar to conform to a tabletop, a top surface of an airplane tray table, or similar mounting surface. The vertical portion 814 extends along a height 820 that is approximately orthogonal to a plane 818 defined by the stand portion 812. An optional chest support 825 is disposed on the vertical portion 814. The inclined portion 816 is disposed at approximately a 45-degree angle with respect to the height 820 of the vertical portion 814. It is noted that the inclined portion 816 can be disposed at other angles with respect to the height 820, such as 15 degrees, 30 degrees, 60 degrees, or 75 degrees.

A male connector 824 is disposed at a distal end 826 of the inclined portion 816. When the bodyrest 80 is in an assembled configuration the male connector 824 is disposed in a recess 832 defined in a proximal end 834 of the head support 830 to mechanically connect the head support 830 with the base 810. Likewise, the head support 830 and base 810 can be separated (e.g., for storage or travel) by removing the connecter 824 from the recess 832.

The head support 830 comprises a generally annular body 835 shaped to conform to a user's face while seated in a forward-leaning position. The body 835 includes a lower portion 840, side portions 845, and an upper portion 850. The lower portion 840 can be aligned with a user's chin when the user is seated in a forward-leaning position. The side portions 845 can be aligned with respective sides of a user's face (e.g., cheeks) when the user is seated in a forward-leaning position. The upper portion 850 can be aligned with the top of a user's head (e.g., forehead) when the user is seated in a forward-leaning position. A temple support portion 855 can extend from the upper portion 850 towards the user to support a user's temple. An aperture 860 is defined by the annular body 835. The aperture 860 can be aligned with one or more sensory organs on the user's face, such as the eyes, nose, and/or mouth.

Figure 7A:
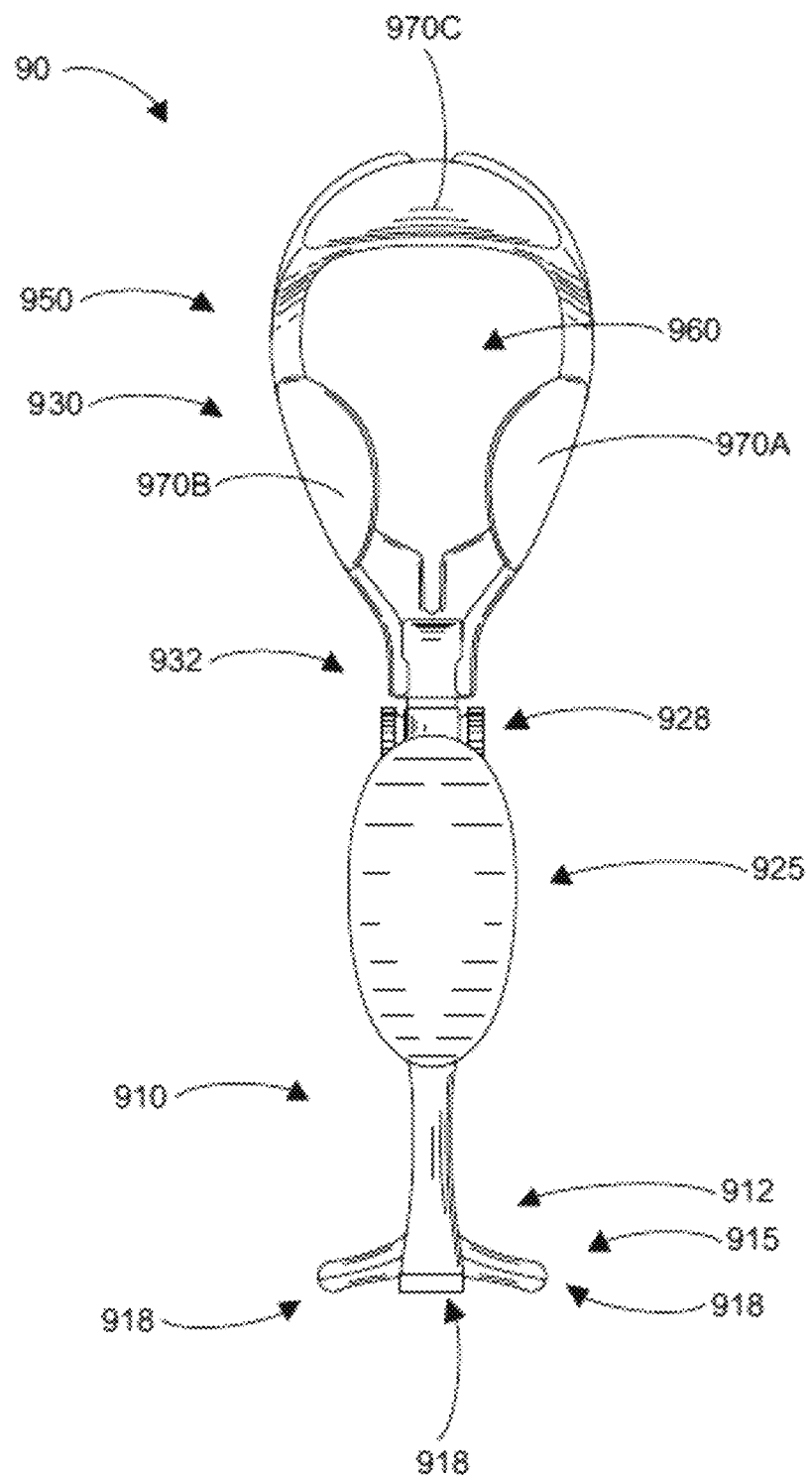
FIG. 7A illustrates a front view of a bodyrest according to an embodiment.

FIG. 7 illustrates an embodiment of a bodyrest 90 for a user seated in a forward-leaning position. The bodyrest 90 can be a personal support apparatus and/or a personal rest system.

Figure 7B:
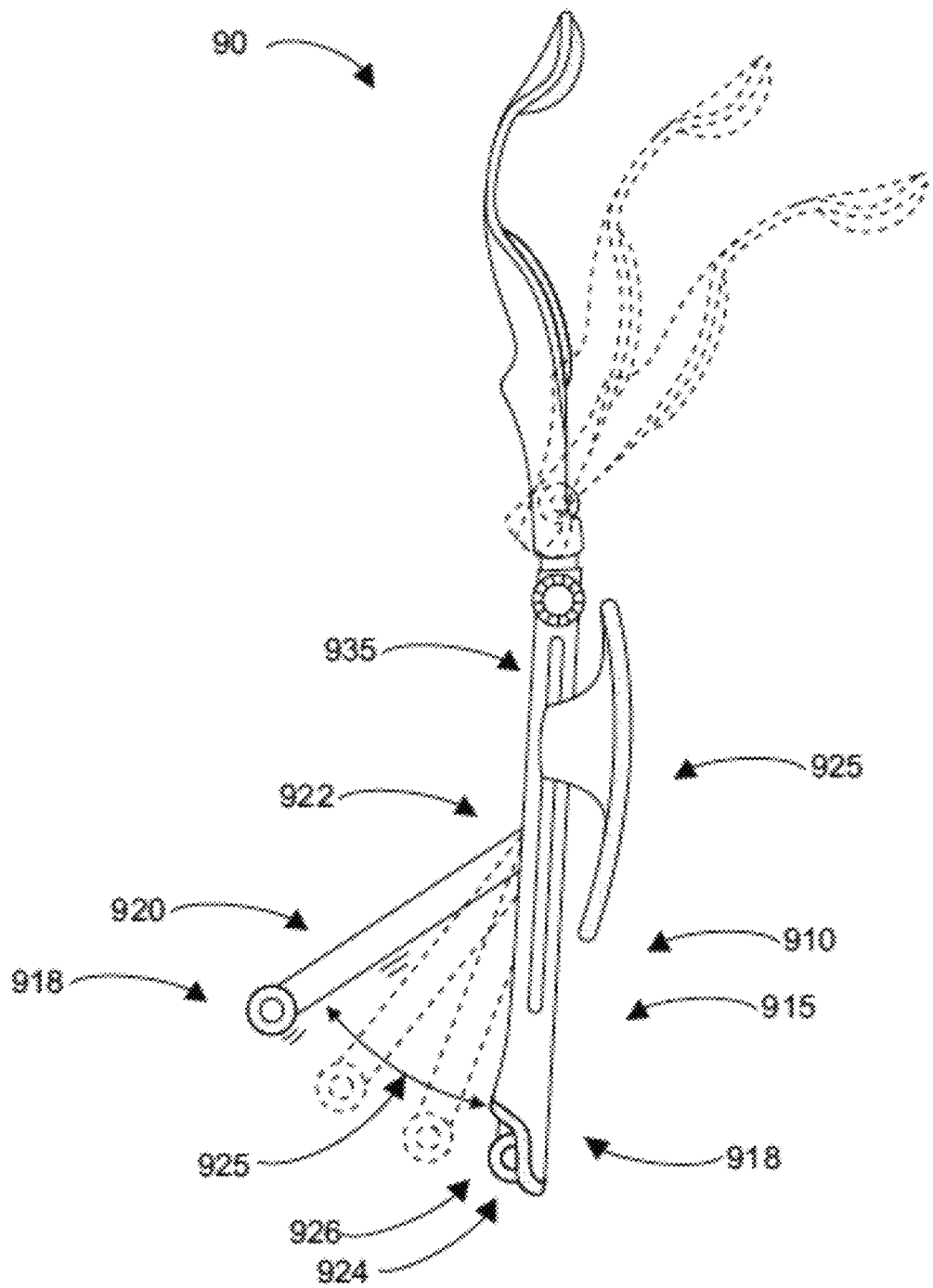
FIG. 7B illustrates a side view of a bodyrest according to an embodiment.

The bodyrest 90 includes an elongated body 910 that is mechanically coupled to a head support 930. The body 910 includes a support stand 915 disposed at a first end 912 of the body. The support stand 915 is formed of multiple legs 918. Some of the legs 918 are disposed on an optional secondary support arm 920 as illustrated in FIG. 7B, which shows a side view of the bodyrest 90. At least one leg 918 includes an optional notch 924 to conform the leg 918 to an edge 926 of a table or similar working surface.

Returning to FIG. 7B, a proximal end 922 of the secondary support arm 920 is rotatably coupled to the body 910 as indicated by arrow 925. The secondary support arm 920 can rotate from a first position where the secondary support arm 920 is approximately parallel to the body 910 to a second position where the secondary support arm 920 is disposed at approximately 45-degree angle with respect to the body 910. Those skilled in the art will recognize that the secondary support arm 920 can be adjustably disposed at a wide range of angles with respect to the body 920, as indicated by the arrow 925, including 15 degrees, 30 degrees, 60 degrees, 75 degrees, 90 degrees, or any angle therebetween. In some embodiments, the secondary support arm 920 can lock at one or more angles to customize the angle of the secondary support arm 920 and/or the body 910 to provide a degree of freedom for the bodyrest 90.

A chest support 925 is disposed on the body 910. The chest support 925, as discussed above, provides support to a user's chest and upper body while using the bodyrest 90. The chest support 925 is optionally adjustable along a length of the body 910 in a groove 935 to provide an additional degree of freedom for the bodyrest 90. The chest support 925 can be locked at given height/position with a knob 928 or similar device (e.g., a screw, a clamp, etc.).

Returning to FIG. 7A, the head support 930 includes an annular frame 950 that defines an aperture 960 that aligns with a user's face, as discussed above. A plurality of support pads 970A-C are disposed on the frame 950. The pads 970A-C are aligned with certain features of a user's face, such as the user's cheeks (e.g., pads 970A, B) and forehead (e.g., pad 970C). The pads 970A-C can be adjustable along the frame 950, for example using a hook-and-loop fastener (e.g., Velcro®), an adhesive, a peg, straps, clasps, hooks, magnetic fasteners (e.g., magnetic clasps and/or magnetic snaps) or other attachment mechanism etc. In addition, the head support 930 is optionally pivotably connected to the base 910 at a joint 932. Using the joint 932, the head support 930 can pivot towards or away from the chest support 925, as illustrated in FIG. 9B. The pivot angle of the head support 930 can be locked into place using a tightening mechanism, such as a screw. For a more compact, stowed configuration, the head support 930 can pivot 180 degrees towards the chest support 925 so that the head support 930 is disposed against the chest support 925.

FIGS. 8A-8I illustrate various perspectives of a body support 1000. The body support 1000 can be a personal support apparatus and/or a personal rest system.

Figure 8A:
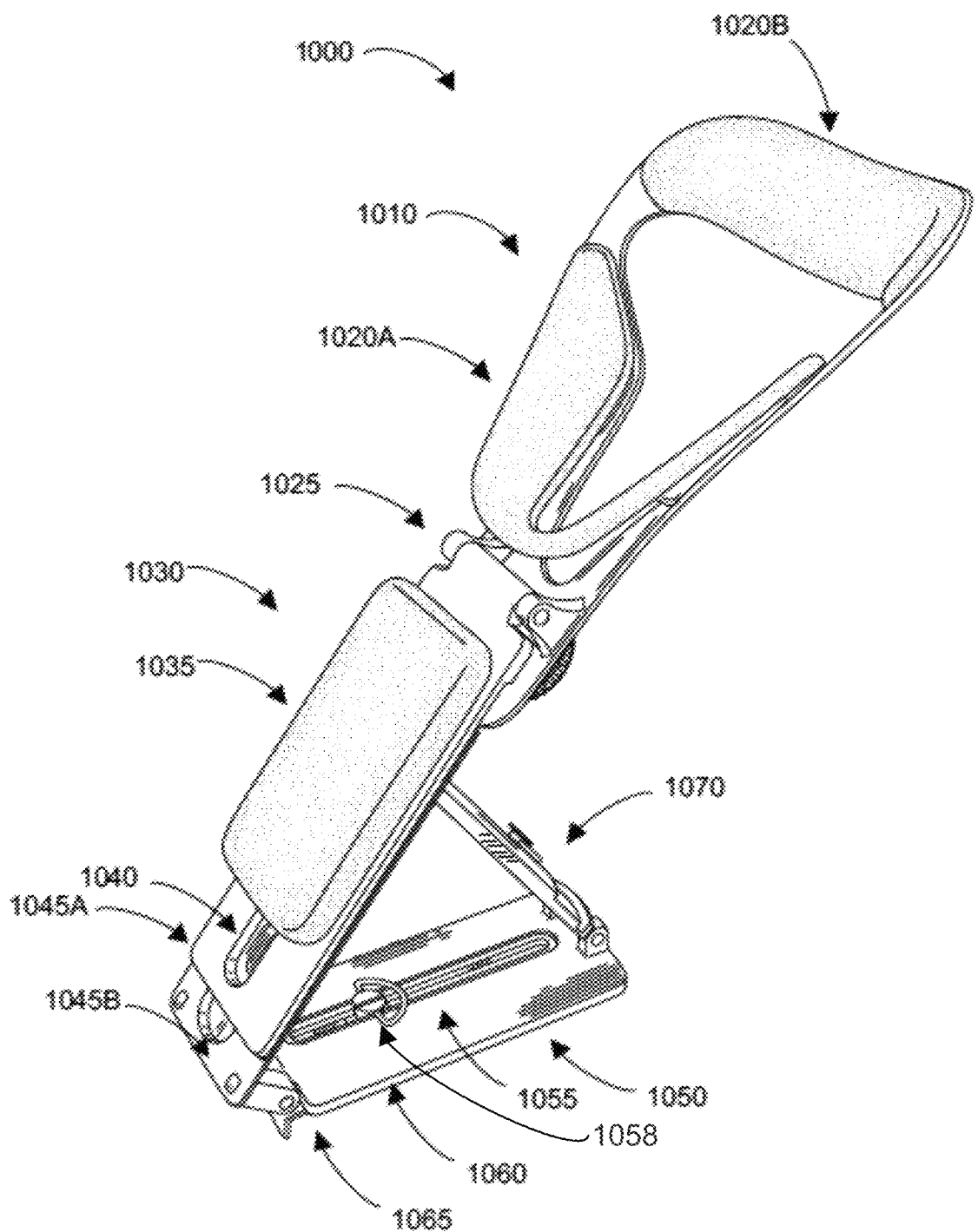
FIG. 8A illustrates a perspective view of a body support according to an embodiment.
Figure 8B:
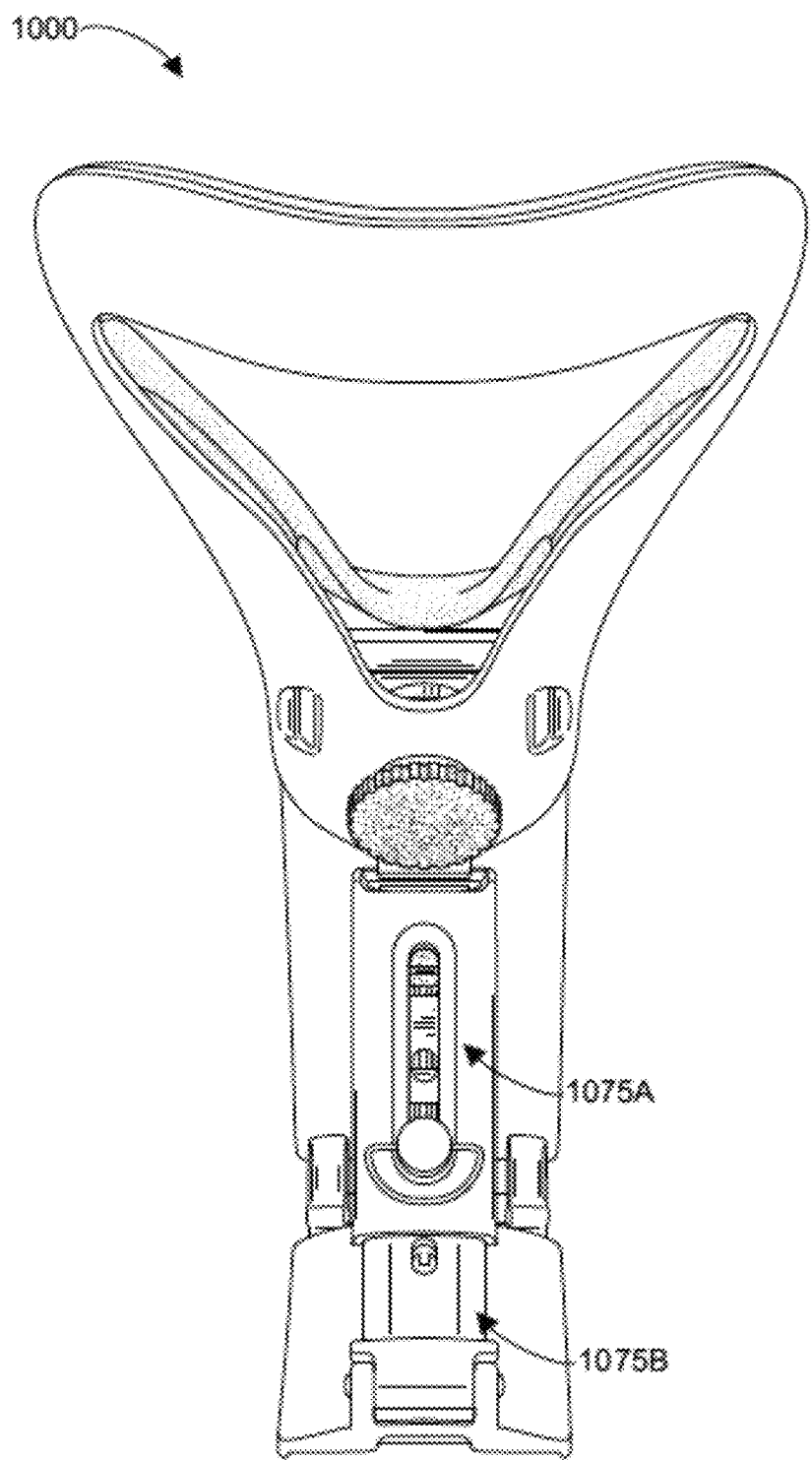
FIG. 8B illustrates a rear view of a body support according to an embodiment.
Figure 8C:
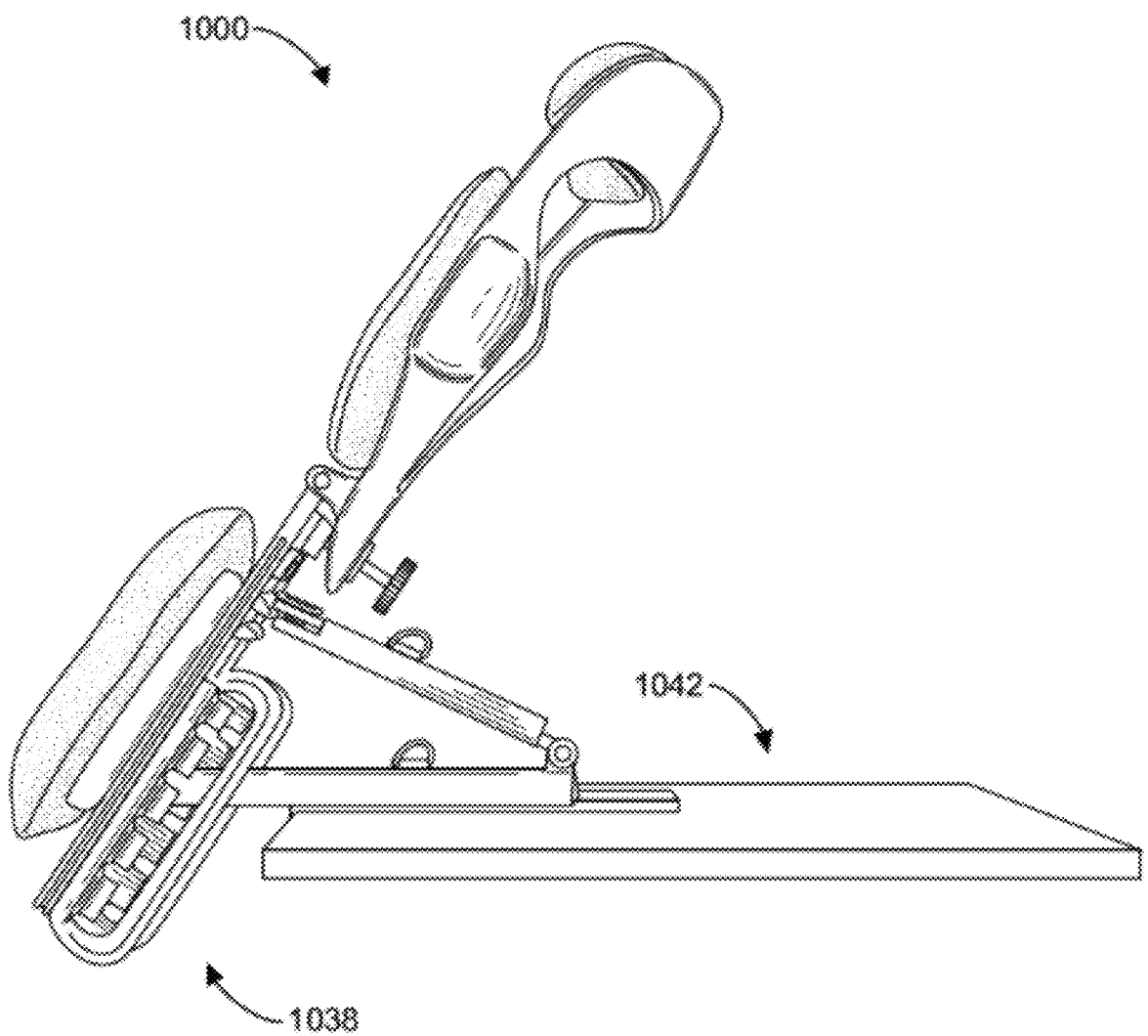
FIG. 8C illustrates a side view of a body support according to an embodiment.
Figure 8D:
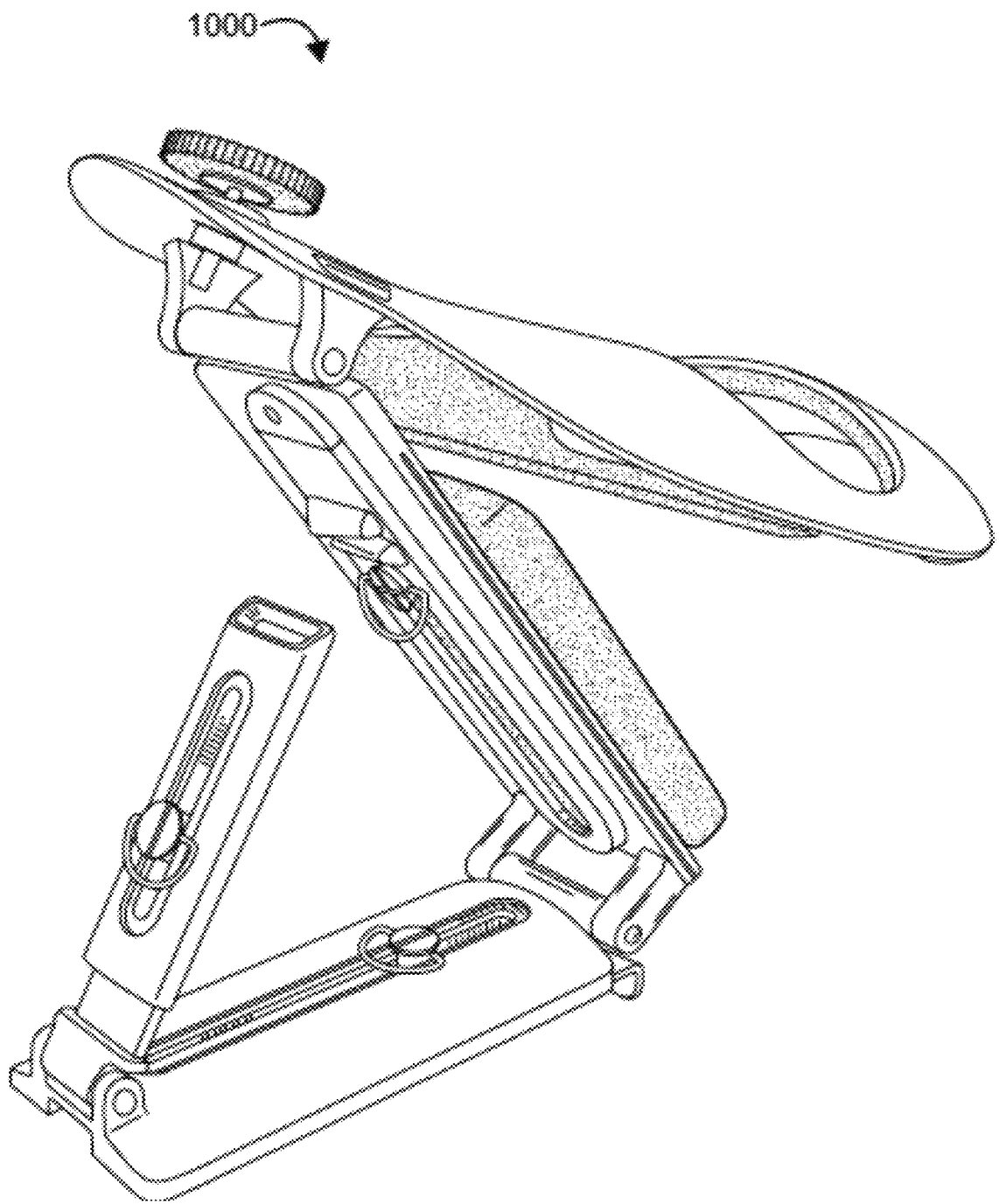
FIG. 8D illustrates a perspective view of a body support according to an embodiment.
Figure 8E:
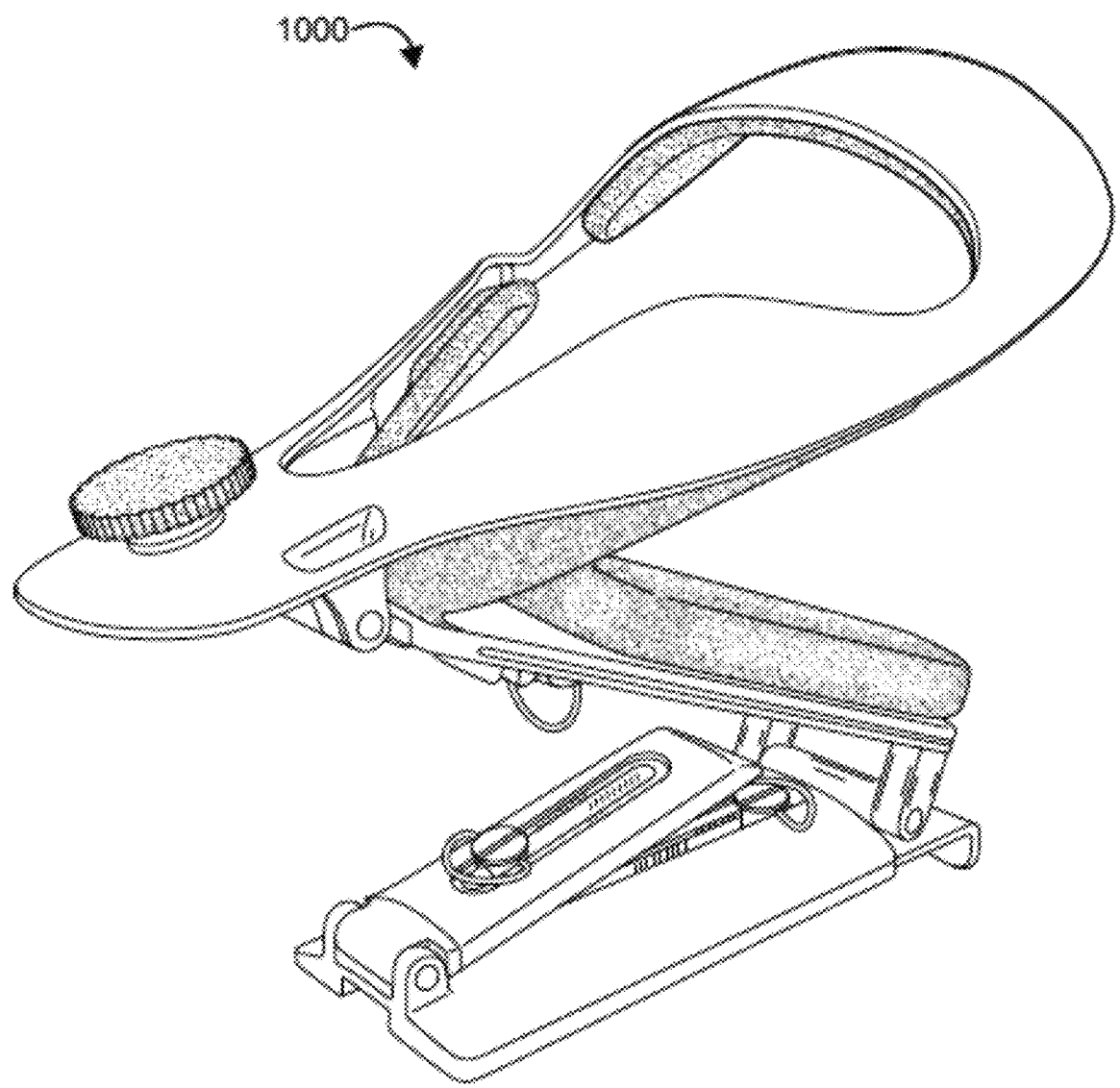
FIG. 8E illustrates a perspective view of a body support according to an embodiment.

The body support 1000 includes various adjustable components for customization in various degrees of freedom. The body support 1000 includes a head support 1010 having a frame. Pads 1020A, 1020B are mounted on the frame to support the user's face (e.g., chin and forehead). The frame is pivotably attached to a body 1030 at a pivot point 1025 thus allowing the frame to fold towards the body 1030 for storage (e.g., as illustrated in FIGS. 8D and 8E). The head support 1010, pads 1020A, 1020B, and/or frame can include a receptacle for an aromatherapy cartridge, as described below. The head support 1010 frame can comprise a thermoplastic material and can be formed by injection molding. The head support 1010 frame can have a thickness of about 0.125 inches to about 0.5 inches, including about 0.25 inches, which can vary along the head support 1010 frame. As used herein, "about" means plus or minus 10% of the relevant value.

A chest support 1035 is attached to the body 1030. The chest support 1035 can adjustably slide along a groove 1040 for custom positioning of the chest support 1035 at a desirable height for a user. The chest support 1035 can lock at desired position in the groove 1040, for example with a pin, a ratcheting mechanism, or similar structure.

The body 1030 includes a first plate 1045A and a second plate 1045B. The plates 1045A, 1045B can slide with respect to each other to shorten or lengthen the body 1035. By adjusting the length of the body 1035, the body support 1000 can be adjusted to a customized height (e.g., a longer body 1030 for a taller user).

The body 1030 is mechanically connected to an adjustable base 1050. The base 1050 defines a groove 1055 for sliding a base plate 1060 with respect to a clamp 1065, which is configured to attach to a table or working surface. By adjusting the base 1050, the chest support 1035 and the head support 1010 can be positioned towards or away from a user. A pin 1058 extends from the base 1050 to slide/adjust the base plate 1060 as described above.

In some embodiments, the base 1050 can slide away from the clamp 1065 and the table/working surface (and towards the user). The base 1050 can overhang the table/working surface to allow the body 1030 and/or chest support 1035 to slide (e.g., using saw tooth mechanism 1038) below a plane defined by a top surface 1042 of the table or the working surface as illustrated in FIG. 8C. Support arms 1070, 1072 are configured to support the body 1030 and/or chest support 1035. Using this configuration, the body support 1000 can accommodate a wide range of users while being placed on a table/working surface at various heights.

An adjustable support arm 1070 is disposed between the base 1050 and the body 1030 to provide mechanical support to the body 1030. The support arm 1070 can lengthen or shorten by sliding respective support arm members 1075A, 1075B (e.g., as illustrated in FIG. 8B), which causes the body 1030 and chest support 1035 to pivot towards or away from the user. The support arms 1070, 1072 can have a quick release attachment mechanism, which can allow the body support 1000 to be collapsed easily into a stowed configuration, as described below.

In some embodiments, a light source is integrated into or attached to the base 1050 and/or the frame. A user can use the light source for reading, etc. while using the body support 1000.

Figure 8F:
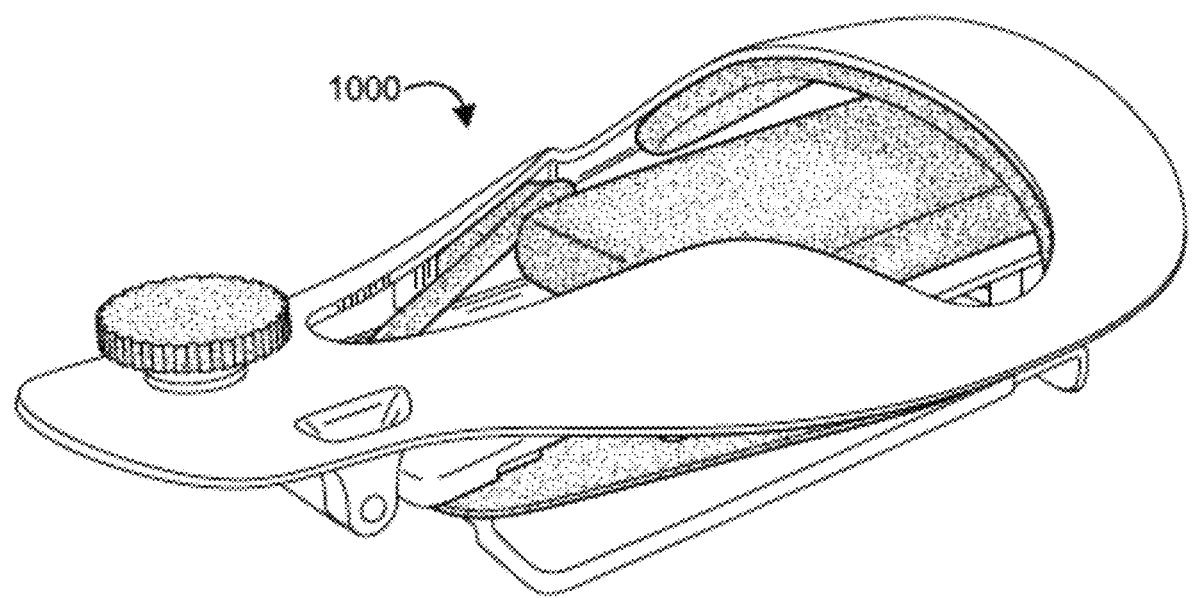
FIG. 8F illustrates a perspective view of a body support according to an embodiment.

The body support 1000 can collapse into a stowed configuration as illustrated in FIGS. 8D through 8F. To collapse, the support arm 1070 detaches from the body 1030, which allows the support arm 1070 and body 1030 to pivot inwardly towards the base 1050. In addition, the head support 1010 pivots towards the body 1030. In the stowed configuration, the head support 1010, the support arm, the body 1030, and the base 1050 can be disposed substantially parallel to one other, as illustrated in FIG. 8F. The support 1000 is substantially smaller (e.g., in the vertical direction) in the stowed configuration, which is advantageous for portability (e.g., during travel).

Figure 8G:
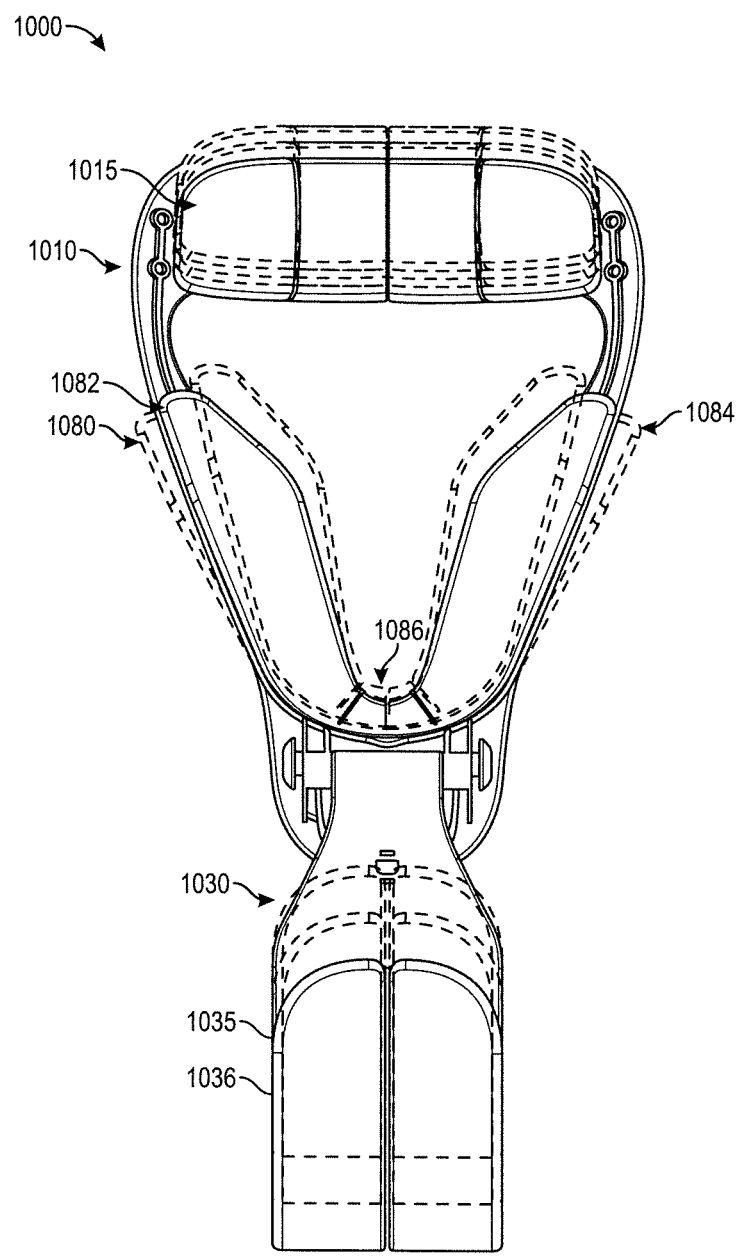
FIG. 8G is a detailed view of head support and body according to one or more embodiments.

FIG. 8G is a detailed view of head support 1010 and body 1030 of body support 1000 according to one or more embodiments. Head support 1010 includes a forehead support cushion 1015 and a lower support cushion 1080. The forehead support cushion 1015 is adjustably attached to head support 1010, for example by snaps, hook-and-loop fasteners (e.g., Velcro®), an adhesive, straps, clasps, hooks, magnetic fasteners (e.g., magnetic clasps and/or magnetic snaps) or other attachment mechanism. The adjustable attachment allows the forehead support cushion 1015 to be adjusted upwardly and downwardly to accommodate users having different face sizes. In one example, the forehead support cushion 1015 can be adjusted to a high position (i.e., away from body 1030) to accommodate a user having a larger or longer face. In another example, the forehead support cushion 1015 can be adjusted to a low position (i.e., towards body 1030) to accommodate a user having a smaller or shorter face. In some embodiments, the forehead support cushion 1015 can be removed and/or replaced by disabling the attachment mechanism. For example, the hook-and-loop fasteners can be pulled apart to remove (and/or adjust) the forehead support cushion 1015. The forehead support cushion 1015 can have a thickness of about 1 inch to about 2 inches, including about 1.25 inches, about 1.45 inches, about 1.5 inches, and about 1.75 inches. The forehead support cushion 1015 can also have a width of 5.5 inches to about 6.5 inches, including about 5.75 inches, about 6 inches, and about 6.25 inches. The forehead support cushion 1015 can also have a length or height of about 1 inch to about 2 inches, including about 1.25 inches, about 1.5 inches, and about 1.75 inches.

The lower support cushion 1080 includes first and second sections 1082, 1084 that are adjustably attached to head support 1010, for example by snaps, hook-and-loop fasteners (e.g., Velcro®), an adhesive, straps, clasps, hooks, magnetic fasteners (e.g., magnetic clasps and/or magnetic snaps) or other attachment mechanism. The first and second sections 1082, 1084 support the user's cheeks when the user is in a forward-leaning position. A center section 1086 of lower support cushion 1080 supports the user's chin when the user is in a forward-leaning position. In some embodiments, the lower support cushion 1080 can be removed and/or replaced by disabling the attachment mechanism. For example, the hook-and-loop fasteners can be pulled apart to remove (and/or adjust) the lower support cushion 1080. The lower support cushion 1080 can have a thickness of about 0.5 inches to about 1.5 inches, including about 0.7 inches, about 0.75 inches, about 1 inch, and about 1.25 inches. In addition, the lower support cushion 1080, when the center section is in an unflexed state (as described below), can have a length (i.e., from first section 1082 to second section 1084) of about 4.5 inches to about 5 inches, including about 4.75 inches, and it can have a width of about 5 inches to about 6.5 inches, including about 5.5 inches, about 5.75 inches, about 6 inches, about 6.2 inches, and about 6.25 inches.

The first and second sections 1082, 1084 can be adjusted inwardly or outwardly to accommodate users having different face sizes. In one example, the first and second sections 1082, 1084 are adjusted inwardly to accommodate a user having a smaller or narrower face. In another example, the first and second sections 1082, 1084 are adjusted outwardly to accommodate a user having a larger or wider face. The first and second sections 1082, 1084 can also be adjusted upwardly (i.e., away from body 1030) or downwardly (i.e., towards body 1030) to accommodate users having different face sizes. Moving the first and second sections 1082, 1084 upwardly or downwardly also causes the center section 1086 to move upwardly or downwardly to support the user's chin at different heights.

Thus, the lower support cushion 1080 can be adjusted in two degrees of freedom: (a) laterally (inwardly or outwardly) and/or (b) vertically (upwardly or downwardly). All combinations of the foregoing are possible. For example, the lower support cushion 1080 can be adjusted inwardly and upwardly, inwardly and downwardly, outwardly and upwardly, and/or outwardly and downwardly.

FIG. 8G also illustrates the adjustability of the chest support 1035 with respect to the base 1050. The chest support 1035 can be adjusted upwards or downwards so that the chest support 1035 aligns with the user's sternum. The body support 1000 can also include additional adjustment mechanisms to align the chest support 1035 with the user's sternum, for example as described above with respect to FIGS. 8A-8F. The inventors have recognized that the sternum is a desirable location to support the user's body because the sternum is a large, flat bone that is designed to protect the lungs, blood vessels, heart, parts of the spleen, stomach and kidneys from traumatic injury. Thus, the sternum is designed to withstand pressure from the chest support 1035 to support the user in a forward-leaning position while using the body support 1000. The chest support 1035 and chest support cushion 1036 have generally planar surfaces to generally conform to the shape of the sternum. As discussed above, the adjustability mechanisms described herein (e.g., the adjustability of the chest support 1035, the chest support cushion 1036, and the base 1050) allow the user to align the chest support 1035 and chest support cushion 1036 with the user's sternum.

The chest support 1035 has a narrow profile to facilitate portability of the body support 1000. In some embodiments, the chest support 1035 is about 2.5 inches to about 3.5 inches wide, including about 3 inches wide; about 5 inches to about 7 inches long, including about 6 inches long; and about 0.5 inches to about 1 inch thick, including about 0.8 inches thick. A chest support cushion 1036 is adjustably attached to chest support 1035, for example by snaps, hook-and-loop fasteners (e.g., Velcro®), an adhesive, straps, clasps, hooks, magnetic fasteners (e.g., magnetic clasps and/or magnetic snaps) or other attachment mechanism. The chest support cushion 1036 can be adjusted upwardly or downwardly with respect to the chest support 1035 as desired by the user. In some embodiments, the chest support cushion 1036 can be removed and/or replaced by disabling the attachment mechanism. For example, the hook-and-loop fasteners can be pulled apart to remove (and/or adjust) the chest support cushion 1036. In some embodiments, the chest support cushion 1036, the lower support cushion 1080, and/or the forehead support cushion 1015 can comprise a gel or gel-like substance, such as TechnoGel® (available from Technogel US Inc.), and can have a firmness of OOO 10 durometer to OOO 25 durometer, including about OOO 15 durometer and about OOO 20 durometer. A firmness of OOO 10 durometer to OOO 25 durometer, in addition to the shape and volume of the cushions, can provide a uniform or substantially uniform distribution of contact pressure, for example with the user's cheeks, cheekbones, forehead, and/or chest. Providing a uniform or substantially uniform distribution of contact pressure can enhance the user's comfort in the face region. The uniform or substantially uniform distribution of contact pressure also allows the size and volume of the cushions to decrease, while maintaining user comfort, allowing the body support 1000 to be more compact and portable. Moreover, the adjustability features of the body support 1000 allow the user to customize the height and angle of the chest support (e.g., to align with the user's sternum), to customize the height and angle of the head support 1010, to customize the height and angle of the stand 1030, to customize the position of the base 1050, and to customize the position (laterally and/or vertically) of each cushion (e.g., the forehead support cushion 1015; the lower support cushion 1080, including first, second, and/or middle sections 1082, 1084, 1086 thereof; and the chest support cushion 1036). In some aspects, the combination of (a) the uniform or substantially uniform distribution of contact pressure provided by the gel or gel-like cushions, (b) the adjustability features allow the body support 1000 to be more compact and portable without sacrificing user comfort.

The chest support cushion 1036 can have the same or similar dimensions to the chest support 1035. In some embodiments, the chest support cushion 1036 is or includes a padded cushion (e.g., foam), which can be about 0.5 inches to about 2 inches thick, including about 1 inch thick and about 1.5 inches thick, while the lower support cushion 1080 and the forehead support cushion 1015 can comprise a gel or gel-like substance, as discussed above.

Figure 8H:
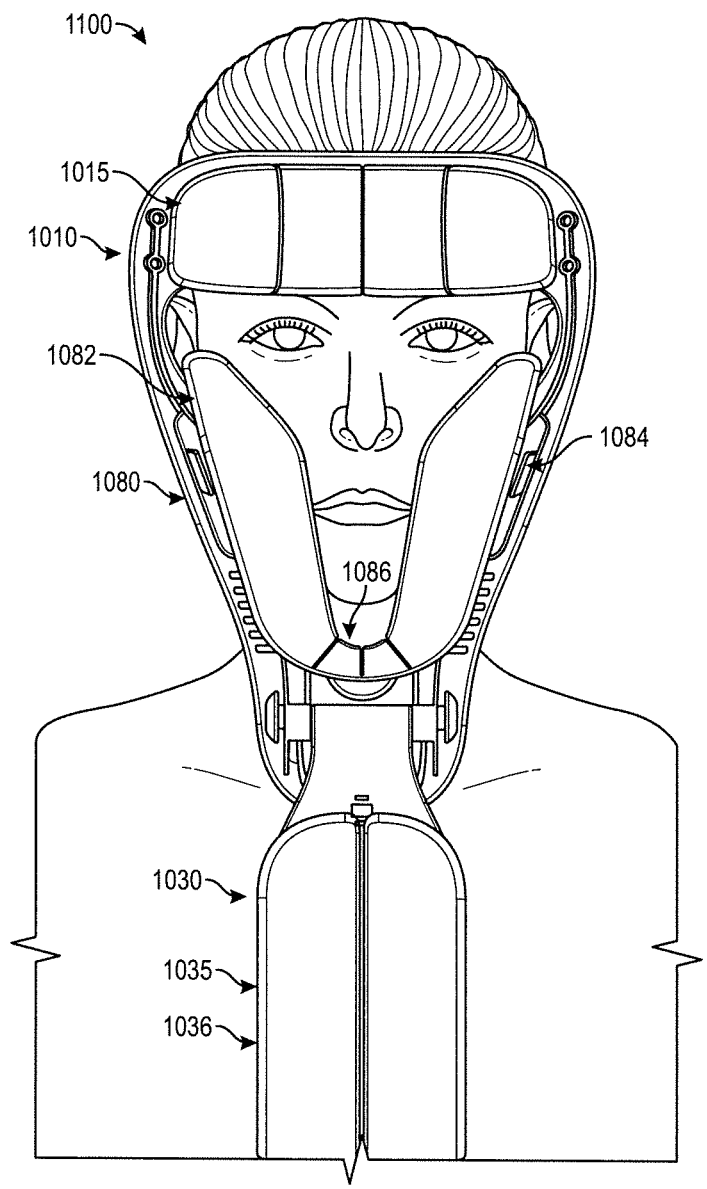
FIG. 8H illustrates the head support and body in use with a person having a small head size.

FIG. 8H illustrates the head support 1010 and body 1030 in use with a person 1100 having a small head size. The person 1100 is facing away from the page in FIG. 8H to illustrate how the head support 1010 and body 1030 align with and support the person's 1100 face. However, in use, the person 1100 would face into the page so that the person's 1100 forehead would be supported by forehead support cushion 1015, and the person's 1100 cheeks and chin would be supported by lower support cushion 1080. To accommodate the relatively small head size of person 1100, forehead support cushion 1015 is adjusted downwardly and the lower support cushion 1080 is adjusted inwardly and upwardly.

Figure 8I:
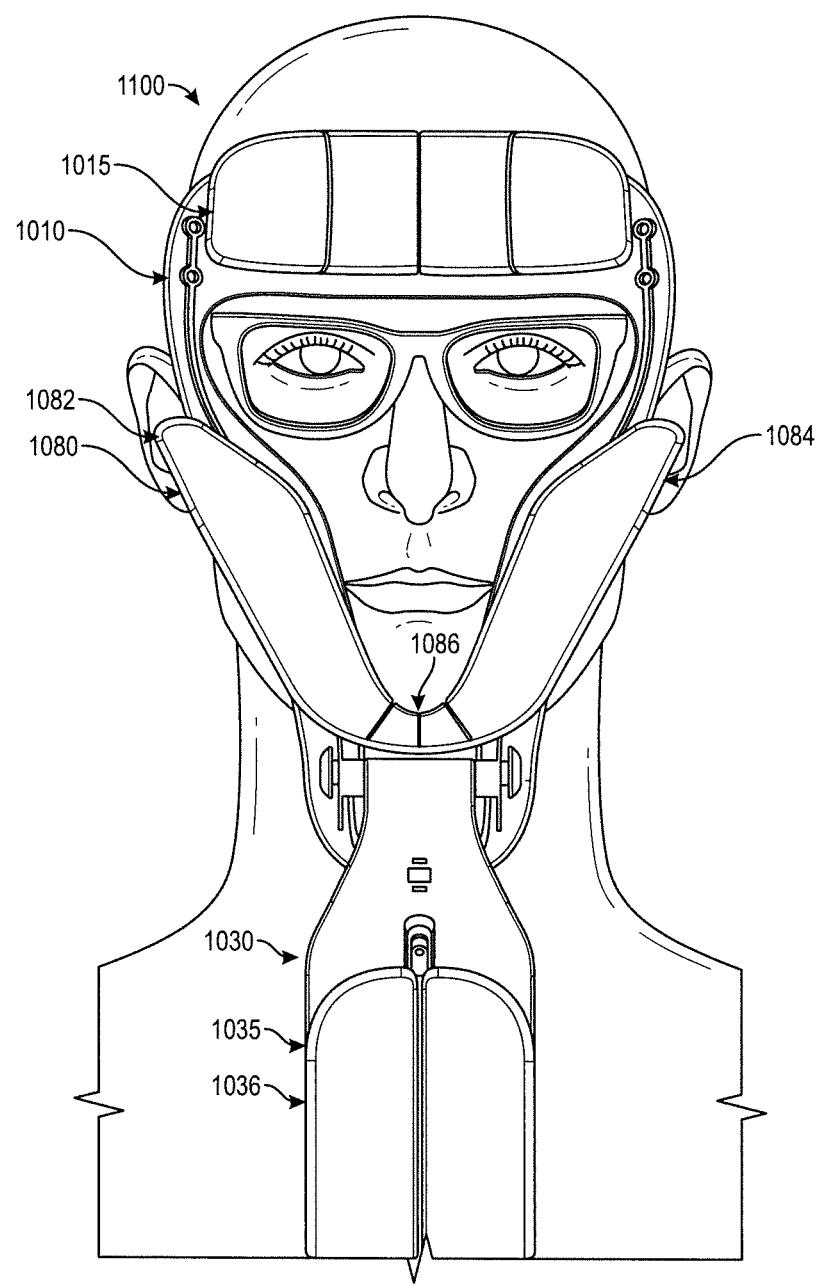
FIG. 8I illustrates the head support and body in use with a person having a small head size.

FIG. 8I illustrates the head support 1010 and body 1030 in use with a person 1101 having a large head size. The person 1101 is facing away from the page in FIG. 8I, for the same reasons as those discussed above with respect to FIG. 8H. To accommodate the relatively small head size of person 1101, forehead support cushion 1015 is adjusted upwardly and the lower support cushion 1080 is adjusted outwardly and downwardly. FIG. 8I also illustrates that the head support 1010 is configured to support the head (e.g., forehead, chin, and cheeks) of the person 1101 while the person 1101 wears glasses, which do not contact the head support 1010.

As can be seen in FIGS. 8H and 8I, the head support 1010 (including the above-described forehead and lower cushions 1015, 1080) contacts the face of the user (e.g., person 1100, 1101) at four locations: the forehead, the left and right cheeks, and the chin. Additional contact points can also be provided.

Figure 9:
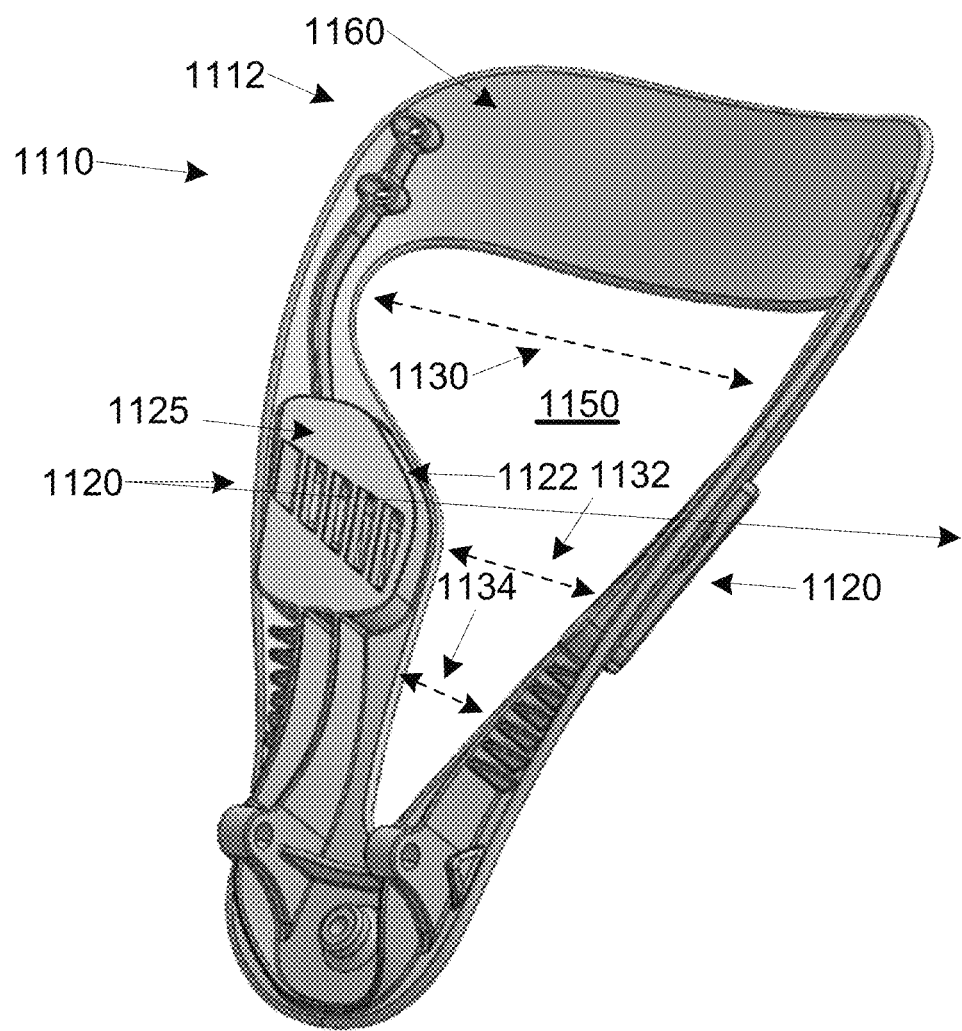
FIG. 9 is a perspective view of a head support according to one or more embodiments.

FIG. 9 is a perspective view of a head support 1110 according to one or more embodiments. The head support 1110 can be the same as, substantially the same as, or different than head support 1010. The head support 1110 includes a generally curved inner surface 1112 that is configured and arranged to support and conform to a user's face. In one example, the curved inner surface 1112 is similar to that found in a mask such that it generally conforms to a user's face.

In addition, FIG. 9 illustrates that head support 1110 includes a pair of cheek support bodies 1120. The cheek support bodies 1120 have a cross-sectional thickness 1122 such that an exposed surface 1125 of each cheek support body 1120 is closer to the user than the inner surface 1112 of head support 1110. The cheek support bodies 1120 provide additional support for the user's cheeks and surrounding bone structure. In some embodiments, each cheek support body 1120 has a width of about 1.25 inches to about 1.75 inches, including about 1.5 inches; a length of about 0.25 inches to about 0.5 inches, including about 0.35 inches; and a depth of about 0.125 inches to about 0.5 inches, including about 0.25 inches. The first and second sections 1082, 1084 of lower support cushion 1080 (not illustrated in FIG. 9) are disposed on the cheek support bodies 1120. In addition, the first and second sections 1082, 1084 of lower support cushion 1080 are removably and adjustably attached to the head support 1110, for example in the region of head support 1110 proximal or adjacent to cheek support bodies 1120. The cheek support bodies 1120 can be symmetrically disposed on the head support 1110.

FIG. 9 also illustrates that a hollow region or aperture 1150 (in general, aperture 1150) defined by the head support 1110 includes an upper section having a first width 1130, a middle section having a second width 1132, and a lower section having a third width 1134. The second width 1132 is narrower than the first width 1130 and the second width 1132 is wider than the third width 1136. Thus, the head support generally tapers inwardly from the first width 1130 to the second width 1132 to the third width 1134. The first width 1130 is wide enough to allow the user's eyes, and preferably glasses, to fit into the aperture 1150 while the user's forehead is supported by a forehead support cushion on forehead support portion 1160 of head support 1110 (e.g., as illustrated in FIGS. 8H and 8I). The second width 1132 is wide enough to allow the user's nose to fit into the aperture 1150 while the user's cheeks are supported by cheek support bodies 1120 (e.g., as illustrated in FIGS. 8H and 8I). The third width 1134 is wide enough to allow the user's mouth to fit into the aperture 1150 while the user's chin is supported by the lower support cushion (e.g., as illustrated in FIGS. 8H and 8I).

Figure 10:
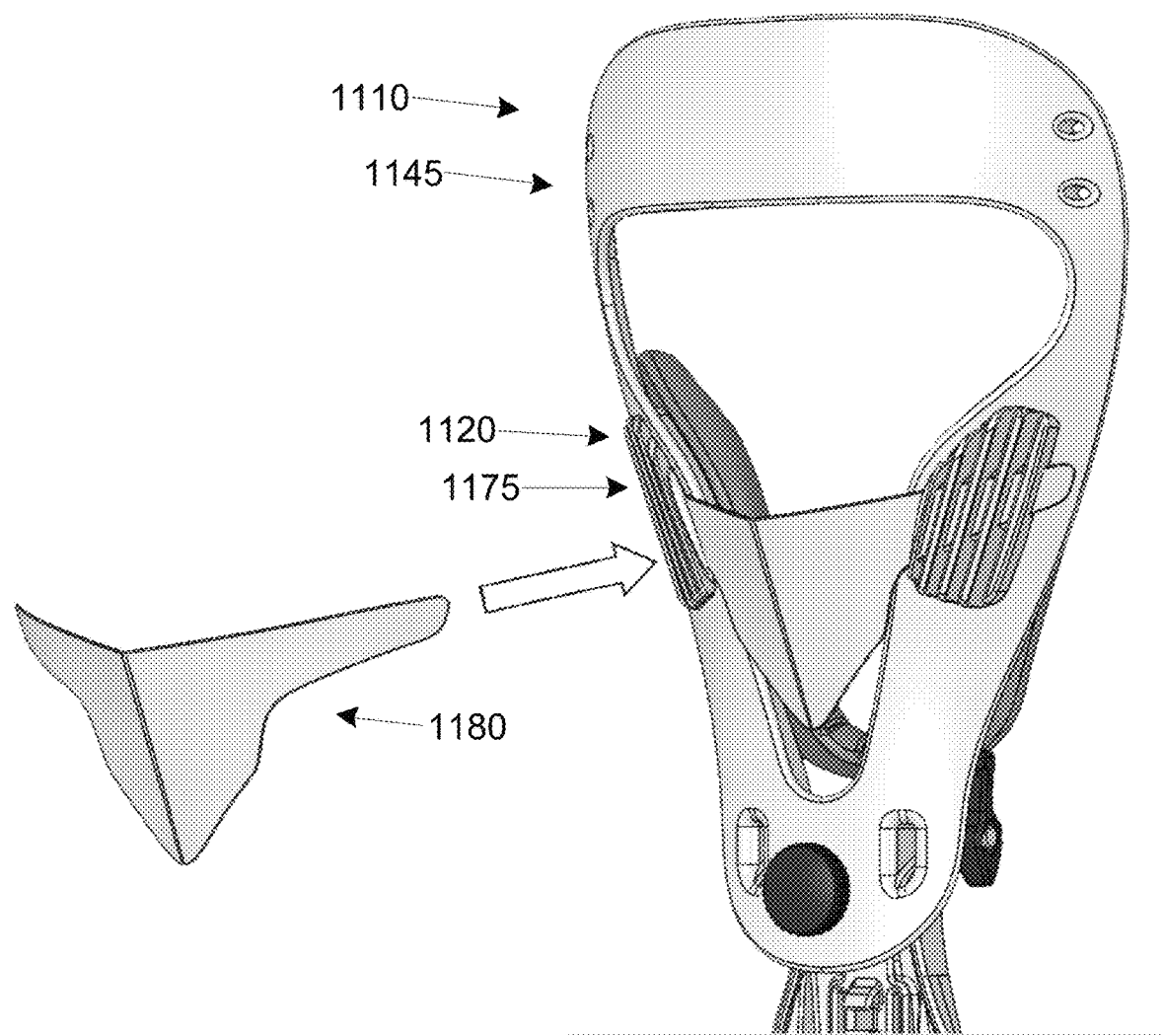
FIG. 10 is a perspective view of the outer surface of head support according to one or more embodiments.

FIG. 10 is a perspective view of the outer surface 1145 of head support 1110 according to one or more embodiments. As illustrated, a pair of aromatherapy receptacles 1175 is disposed on the outer surface 1145 of head support 1110 proximal to cheek support bodies 1120. In some embodiments, the aromatherapy receptacles 1175 and the cheek support bodies 1120 are integrally formed together. In some embodiments, the aromatherapy receptacles 1175 and the cheek support bodies 1120 are aligned on opposing surfaces (e.g., outer and inner surfaces, respectively) of head support 1110. Each aromatherapy receptacle 1175 includes a recess that can accept an aromatherapy strip 1180 such that the aromatherapy strip 1180 is held proximal to the user's nose. The aromatherapy strip 1180 can include one or more scents, fragrances, and/or essential oils.

Figure 11:
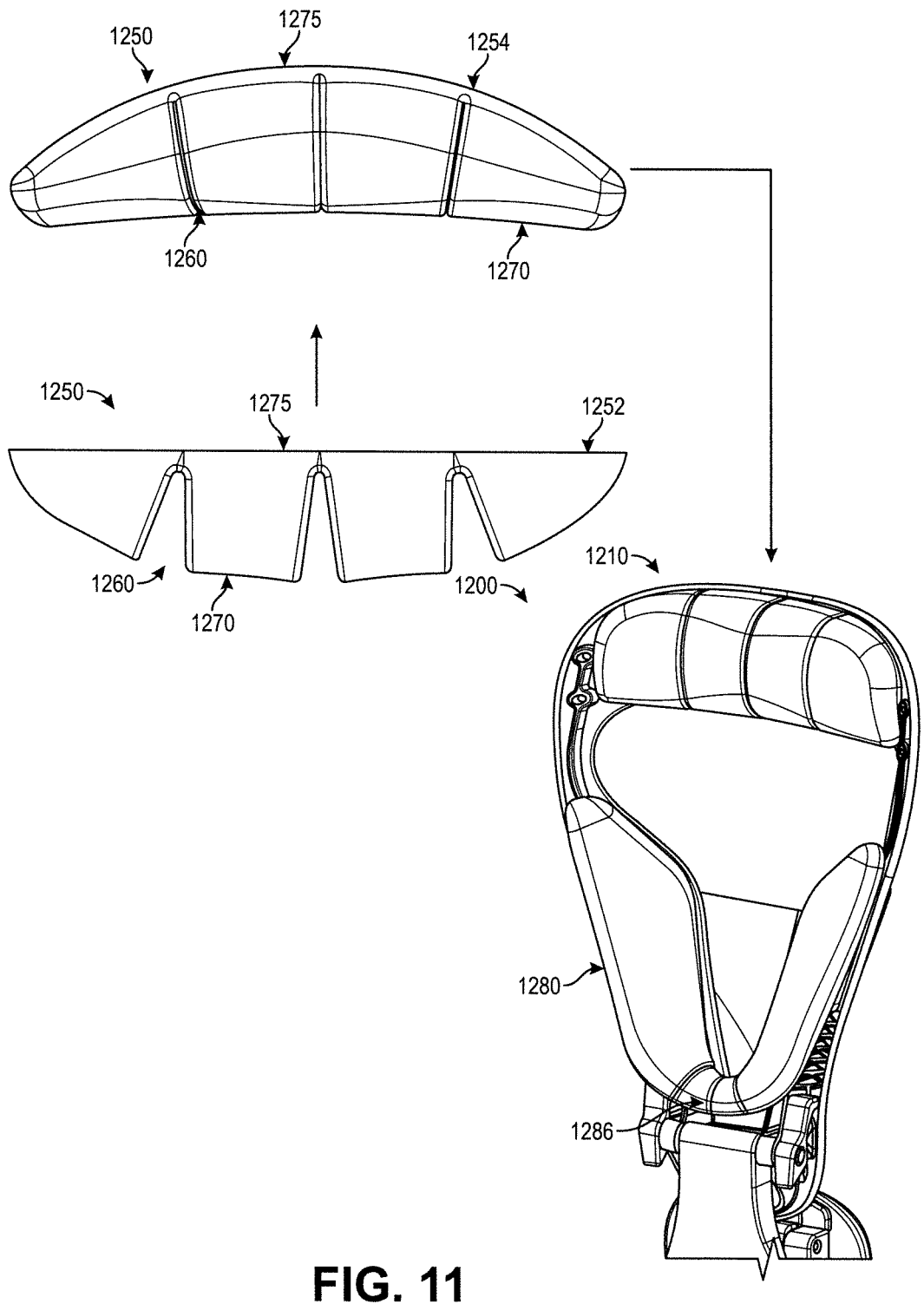
FIG. 11 is a perspective view of a body support to illustrate the structure and function of a representative support cushion in an unflexed state and a flexed state.

FIG. 11 is a perspective view of a portion of body support 1200 to illustrate the structure and function of a representative support cushion 1250 in an unflexed state 1252 and a flexed state 1254 according to one or more embodiments. The support cushion 1250 includes a plurality of notches 1260 defined in a first side 1270 of the support cushion 1250. In the unflexed state 1252, the notches 1260 form gaps between adjacent portions 1270 of the support cushion 1250 and the second surface 1275 of the support cushion is substantially flat or planar. In the flexed state 1254, adjacent portions 1270 of the support cushion 1250 are pressed against one another and to partially or completely fill the gaps and the second surface 1275 forms a curved surface. This allows the support cushion 1250 to be manufactured with a substantially planar or flat second surface 1275 (e.g., in unflexed state 1252), and then it can be flexed into a curved surface (e.g., in flexed state 1254) to mount on head support 1210.

In the example illustrated in FIG. 11, the support cushion 1250 is configured to support a user's forehead at an upper portion of head support 1110. In another example, the center section 1286 of lower support cushion 1280 comprises a similar group of notches. As such, the lower support cushion 1280 can be manufactured in an unflexed state (e.g., at least one surface being substantially flat or planar) but it can be mounted on head support 1210 in a flexed state (e.g., as illustrated in FIG. 11). The support cushion 1250 and/or lower support cushion 1280 can comprise a gel or gel-like substance, such as TechnoGel® (available from Technogel US Inc.) and can have a firmness of OOO 10 durometer to OOO 25 durometer, including about OOO 15 durometer and about OOO 20 durometer.

Figure 12:
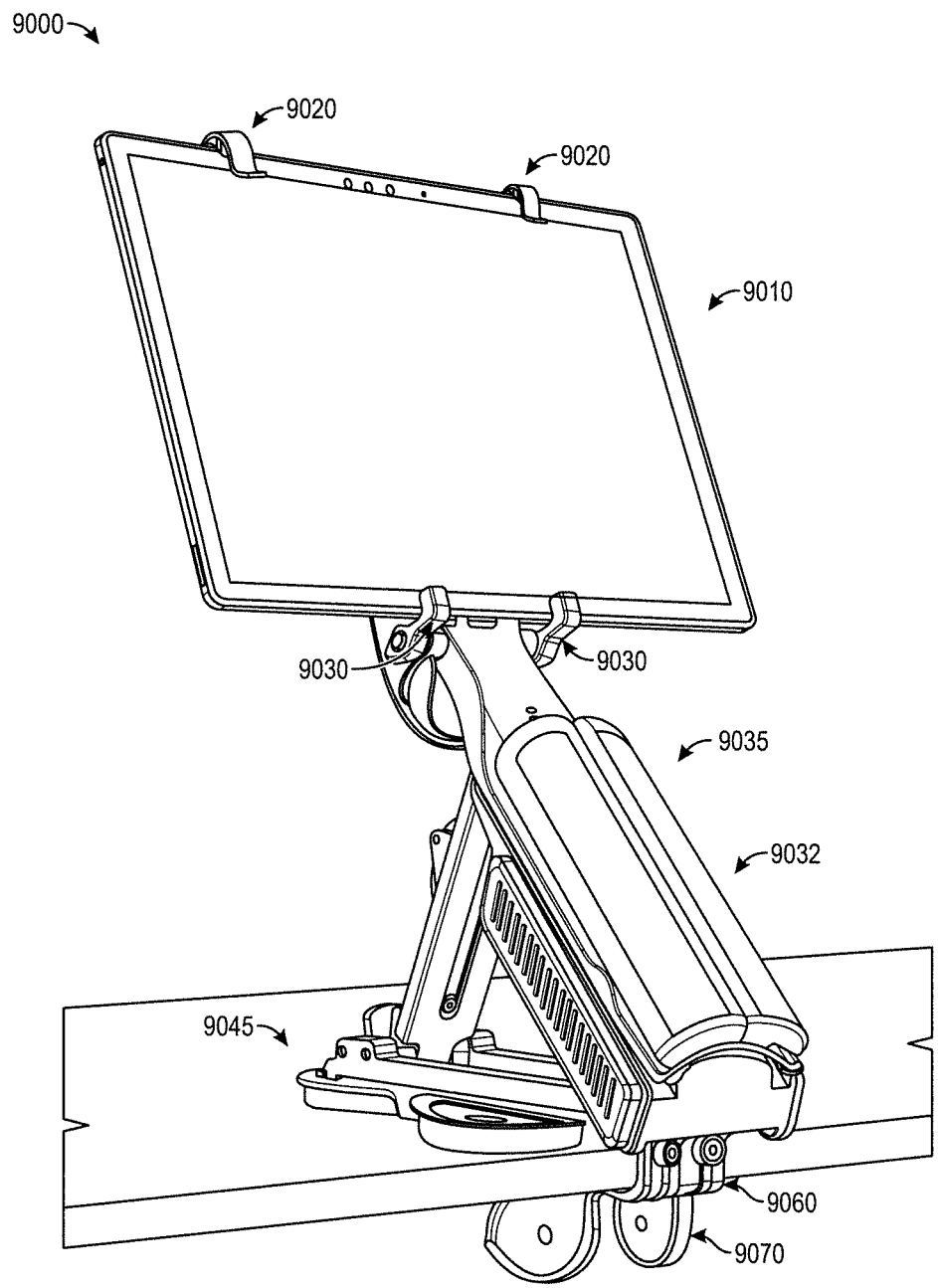
FIG. 12 illustrates a body support that can also function as a mobile device stand, according to one or more embodiments.

FIG. 12 illustrates a body support 9000 that can also function as a mobile device stand 9010, according to one or more embodiments. The mobile device stand 9010 includes an upper mobile device support 9020 and a lower mobile device support 9030. The mobile device supports 9020, 9030 can be or can include hooks, clamps, brackets, or other mechanism(s) that can support and retain the mobile device. The supports 9020, 9030 can include a spring mechanism or they can be semi-rigid such that the supports 9020, 9030 engage and retain the mobile device on the stand 9010. The position of the supports 9020, 9030 can be adjustable so that the mobile device stand 9010 can accommodate mobile devices of different sizes. For example, the supports 9020, 9030 can be moved inwardly to engage a smartphone and they can be moved outwardly to engage a tablet, such as an iPad.

The body support 9000 includes a head support 9050, a body 9032, a chest support 9035, a base 9045. The head support 9050 is viewable in FIG. 13 but it is not viewable in FIG. 12 since it is behind the mobile device. Thus, the head support 9050 can alternately function as a mobile device stand 9010. The body support 9000 can include any or all of the features in the body supports described herein (e.g., in FIGS. 8A-8I and/or FIGS. 9-11). As such, the head support 9050 and other components of the body support 9000 can be adjusted to position the mobile device at the desired height, position, and/or angle.

The device 9000 can include rubberized feet 9070 that can be attached to brackets 9060 to secure the device 9000 to the table.

Figure 13:
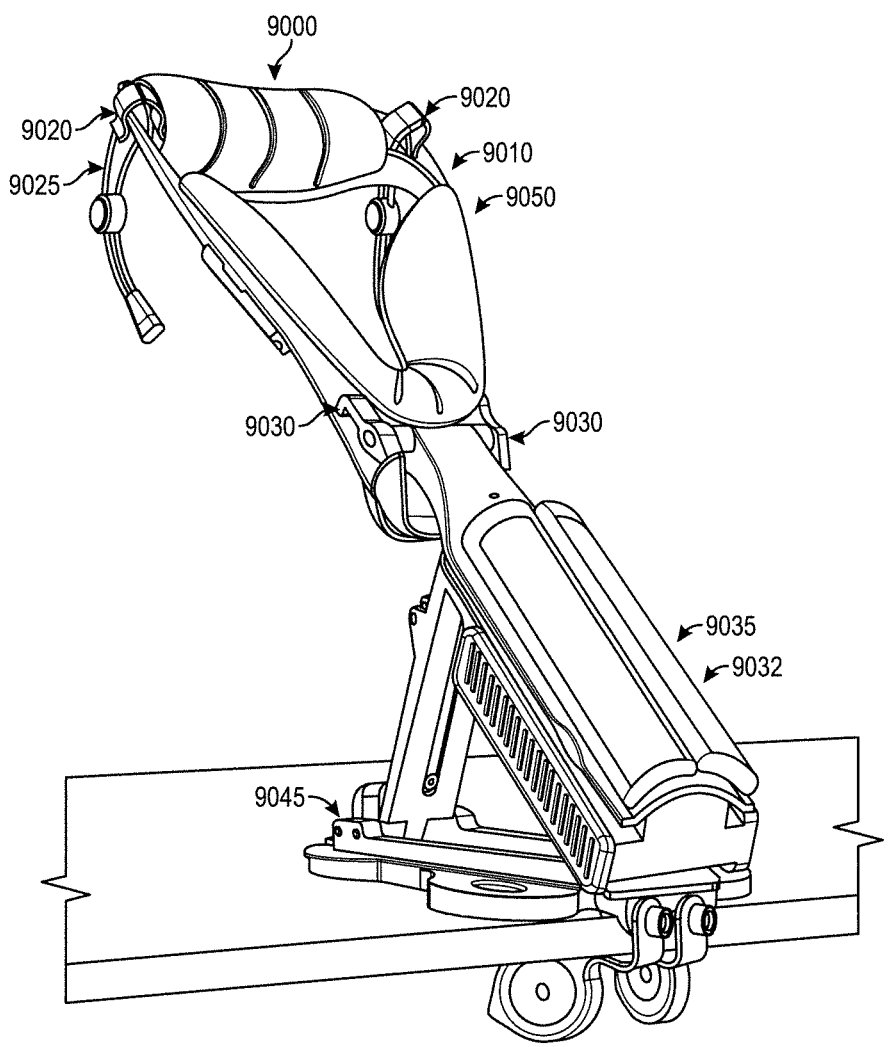
FIG. 13 illustrates the body support of FIG. 12 without a mobile device and with the mobile device supports in a stowed configuration, according to one or more embodiments.

FIG. 13 illustrates the body support 9000 without a mobile device and with the mobile device supports 9020, 9030 in a stowed configuration, according to one or more embodiments. Upper supports 9020 attach to the sides of the head support 9050 frame. FIG. 13 also illustrates that the upper supports 9020 can be attached to an adjustable bungee cord 9025, which itself is secured to the head support 9050 frame. To deploy the upper supports 9020, the user lifts the upper supports 9020 off of the head support 9050 frame and loosens the bungee cord 9025. The user then places the upper supports 9020 on the upper edge of his mobile device and tightens the bungee cord 9025 to secure the mobile device stand. The bungee cord 9025 provides tension to the mobile device so that it is secured against the lower supports 9030. The bungee cord 9025 also reduces or eliminates movement of the mobile device when the user presses on the mobile device's touch screen or one of its buttons.

The lower supports 9030 fold up towards the head support when they are in the stowed position, as illustrated in FIG. 13. The lower supports 9030 can include a telescoping mechanism so that they can be moved outwards to support a wider mobile device.

Figure 14:
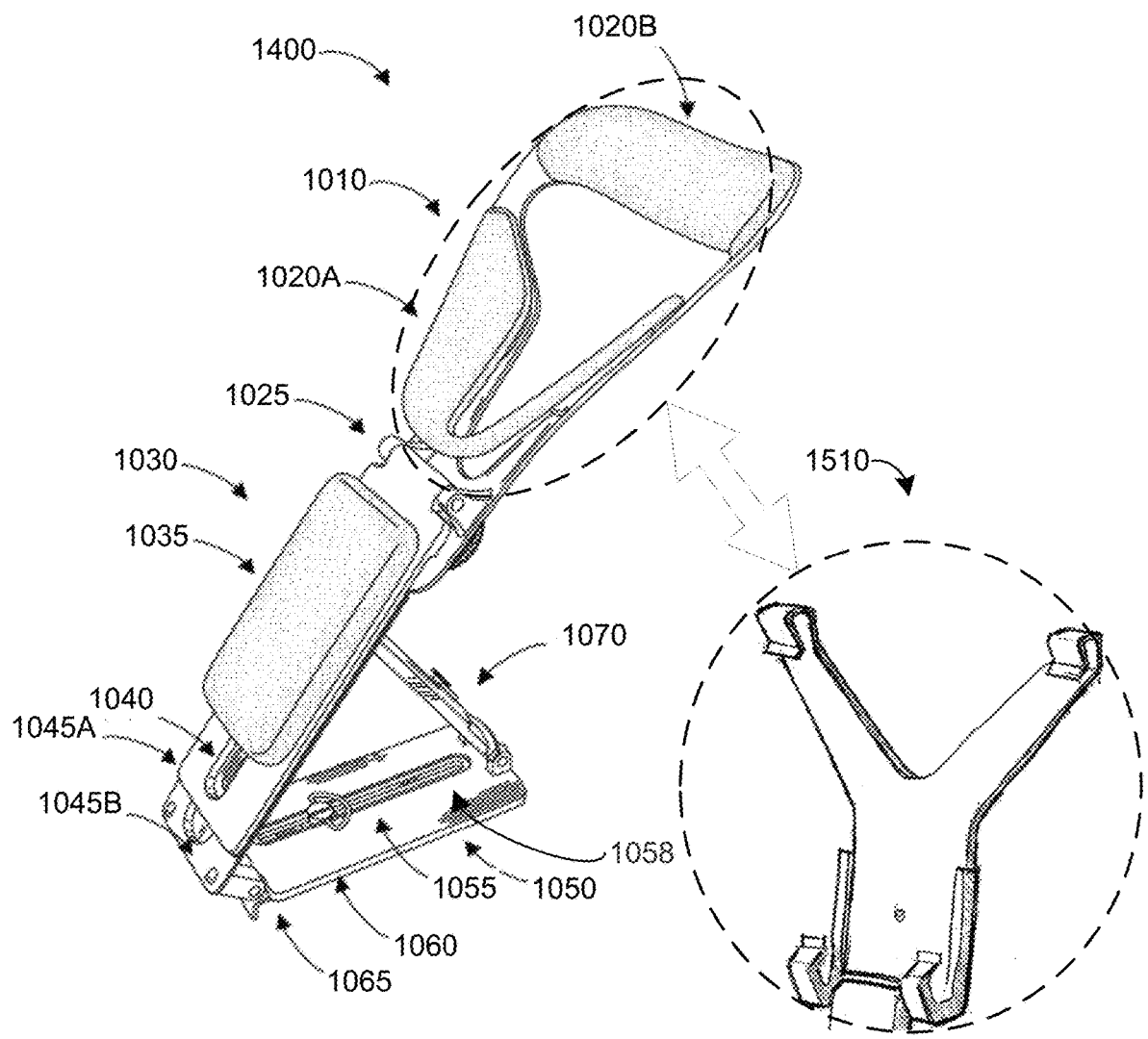
FIG. 14 is a perspective view of an apparatus according to an alternative embodiment.

An alternative embodiment of an apparatus 1400 is illustrated in FIG. 14. The apparatus 1400 can be configured as a personal support apparatus and/or a personal rest system. In addition or in the alternative, the apparatus 1400 can be configured to support a mobile device. When the apparatus 1400 is configured as a personal support apparatus, the apparatus includes a head support 1010. In this configuration, the apparatus 1400 is the same as apparatus 1000. When the apparatus 1400 is configured as a mobile device stand, the head support 1010 can be replaced with (or interchanged with) a mobile device support 1510.

The mobile device support 1510 can include a mobile device support body and hooks. When the apparatus 1400 includes the mobile device support 1510, the apparatus 1400 does not include the optional chest support 1035 or the optional groove 1040, in some embodiments. In other embodiments, the optional chest support 1035 and the optional groove 1040 can be included in the apparatus 1400, and the head support 1010 can be replaced with the mobile device support 1510 as needed by the user. One skilled in the art would understand that the apparatus 1400 can be configured in these and in other configurations.

The mobile device support 1510 can be rotatably and/or pivotably coupled to the stand 1030. Rotatably coupling the mobile device support 1510 to the stand 1030 allows the user to rotate the mobile device support 1510 so that a mobile device disposed thereon can face towards or away from the user (e.g., towards a friend across the table from the user). Pivotably coupling the mobile device support 1510 to the stand 1030 allows the user to adjust the mobile device support 1510 upwards or downwards (e.g., to reduce glare), and to configure the apparatus 1400 in the stowed configuration, as discussed above with respect to apparatus 1000.

The present disclosure should not be considered limited to the particular embodiments described above. For example, one or more of the bodyrests described herein can be adapted for a wheel chair, an arm chair, or other configuration. As a specific example, the bodyrest can include elongated lower supports and/or legs that are configured to support the bodyrest on the arms of a wheel chair and/or between the user's legs while positioning the bodyrest at a height appropriate for the seated user. Similarly, the bodyrest can be configured to rest on or attach to a table that lays across the arms of a wheel chair and/or on the user's lap. Additional modifications, equivalent processes, as well as numerous structures to which the present disclosure may be applicable, will be readily apparent to those skilled in the art to which the present disclosure is directed upon review of the present disclosure.

What is claimed is:

1. A personal support apparatus comprising:
  a head support frame for supporting a front of a user's head while seated in a forward-leaning position;
  a stand having a first end and a second end, the first end attached to the head support frame;
  a chest support adjustably disposed on the stand; and
  a base attached to the second end of the stand, the base including a clamp adapted to receive an edge of a working surface, the base adjustable relative to the clamp along an axis of the base such that the base can adjustably move towards or away from the working surface while the clamp is disposed on the edge of the working surface.

2. The apparatus of claim 1, wherein the second end of the stand is pivotably attached to the base such that the stand can pivot towards or away from the user.

3. The apparatus of claim 2, further comprising a support arm connected to the stand and the base.

4. The apparatus of claim 3, wherein the support arm is detachably connected to the stand.

5. The apparatus of claim 1, wherein the head support frame is pivotably attached to the first end of the stand.

6. The apparatus of claim 5, wherein a pivot angle of the head support frame is releasably lockable.

7. The apparatus of claim 5, wherein the stand is positionable below a plane defined by a top of the working surface.

8. The apparatus of claim 1, wherein the stand has an adjustable length between the first and second ends.

9. The apparatus of claim 8, wherein the stand includes first and second plates that can slide with respect to each other to set the length of the stand.

10. The apparatus of claim 1, further comprising a plurality of mobile device supports adjustably disposed on the frame.

11. The apparatus of claim 1, wherein:
the head support frame is pivotably attached to the first end of the stand,
the second end of the stand is pivotably attached to the base, and
the apparatus is adjustable from a deployed configuration to a stowed configuration.

12. The apparatus of claim 11, wherein in the stowed configuration:
the stand is pivoted towards the base, and
the head support frame is pivoted towards the stand.

13. The apparatus of claim 12, wherein in the stowed configuration the second end of the stand is detached from the base.

14. The apparatus of claim 12, wherein in the stowed configuration a length of the stand is parallel to the base, the length measured between the first and second ends of the stand.

15. The apparatus of claim 14, wherein in the deployed configuration the length of the stand is disposed at an angle with respect to the base.

16. The apparatus of claim 12, wherein a height of the apparatus is smaller in the stowed configuration than in the deployed configuration.

17. The apparatus of claim 12, further comprising a support arm pivotably connected to the base, wherein:
the support arm is pivoted towards the base when the apparatus is in the stowed configuration, and
the support arm is detachably connected to the stand when the apparatus is in in the deployed configuration.

18. The apparatus of claim 1, wherein the base defines a groove for sliding a base plate with respect to the clamp.

19. The apparatus of claim 1, wherein a position of the chest support on the stand is adjustable such that the user can align the chest support with the user's sternum.

* * * * *